Oct. 27, 1959 J. C. WINSLOW 2,909,949

POWER DRILL WITH WORK HOLDING DEVICE AND SPACING MEANS

Filed May 2, 1958 9 Sheets-Sheet 1

INVENTOR.
JAMES C. WINSLOW
BY [signature]
Attorney

Oct. 27, 1959 J. C. WINSLOW 2,909,949

POWER DRILL WITH WORK HOLDING DEVICE AND SPACING MEANS

Filed May 2, 1958 9 Sheets-Sheet 2

INVENTOR.
JAMES C. WINSLOW
BY [signature]
Attorney

Oct. 27, 1959 J. C. WINSLOW 2,909,949

POWER DRILL WITH WORK HOLDING DEVICE AND SPACING MEANS

Filed May 2, 1958 9 Sheets-Sheet 3

INVENTOR.

JAMES C. WINSLOW

BY [signature]

Attorney

Oct. 27, 1959 J. C. WINSLOW 2,909,949

POWER DRILL WITH WORK HOLDING DEVICE AND SPACING MEANS

Filed May 2, 1958 9 Sheets-Sheet 4

INVENTOR.
JAMES C. WINSLOW
BY Ernest [signature]
Attorney

Oct. 27, 1959 J. C. WINSLOW 2,909,949

POWER DRILL WITH WORK HOLDING DEVICE AND SPACING MEANS

Filed May 2, 1958 9 Sheets-Sheet 5

INVENTOR.
JAMES C. WINSLOW
BY
ATTORNEY

Oct. 27, 1959 J. C. WINSLOW 2,909,949

POWER DRILL WITH WORK HOLDING DEVICE AND SPACING MEANS

Filed May 2, 1958 9 Sheets-Sheet 6

INVENTOR.
JAMES C. WINSLOW
BY [signature]
ATTORNEY

Oct. 27, 1959 J. C. WINSLOW 2,909,949

POWER DRILL WITH WORK HOLDING DEVICE AND SPACING MEANS

Filed May 2, 1958 9 Sheets-Sheet 7

INVENTOR.
JAMES C. WINSLOW
BY
ATTORNEY

Oct. 27, 1959 J. C. WINSLOW 2,909,949

POWER DRILL WITH WORK HOLDING DEVICE AND SPACING MEANS

Filed May 2, 1958 9 Sheets-Sheet 8

INVENTOR.
JAMES C. WINSLOW
BY Forest J. Lilly
ATTORNEY

POWER DRILL WITH WORK HOLDING DEVICE AND SPACING MEANS

INVENTOR.
JAMES C. WINSLOW
BY [signature]
ATTORNEY

United States Patent Office 2,909,949

Patented Oct. 27, 1959

2,909,949

POWER DRILL WITH WORK HOLDING DEVICE AND SPACING MEANS

James C. Winslow, Sierra Madre, Calif.

Application May 2, 1958, Serial No. 732,635

40 Claims. (Cl. 77—13)

This invention relates generally to power drills equipped with automatic work holding means. The invention has various uses and adaptations, and will be illustrated herein in several present illustrative forms, one principal embodiment being designed for simultaneously drilling pairs of holes in structural members for mounting conventional "nut plates" thereon, and another principal embodiment being designed for drilling holes in adjustable, predetermined spaced relationship to previously drilled holes.

This application is a continuation-in-part of my prior applications, Power Drill With Automatic Work Holding Means, Serial No. 447,328, filed August 2, 1954, and Pneumatic Power Drill With Spacing Device, Serial No. 591,910, filed June 18, 1956, both now abandoned.

A nut plate comprises a tubular internally screw-threaded barrel formed at its base with a flange projecting in two directions therefrom, usually in opposite directions, with the two extremities of this flange being provided with rivet holes at predetermined spacing from the barrel. In the aircraft industry, for example, huge numbers of such nut plates are used. According to methods used heretofore, the drilling of these holes has required the use of a drilling template, with resulting time consumption.

An object of the present invention is the provision of a power drill capable of simultaneously drilling the holes for a nut plate without use of a template and in greatly reduced time.

A further object is the provision of a power drill capable of simultaneously drilling a plurality of holes in predetermined spacing to one another and to a previously drilled pilot hole.

In the other principal adaptation of the invention, the purpose is to drill a hole in a workpiece in an adjustably predetermined spaced relation to a previously drilled hole, and it is a further object of the invention to provide an improved power drill having such capability.

Another object is the provision of an adjustable drill tool of the character described wherein the adjustment to obtain different hole spacings may be progressive so that any desired spacing, between given limits, may be obtained or stepped so as to provide a plurality of different preset spacings, any one of which may be selected for a given drilling operation.

A further object of the invention is to provide a power drill provided with an automatic means for clamping to the work, and with means for thereafter advancing one or more drills through the work.

A still further object is the provision of a power drill provided with a pilot means engageable with a pilot hole in the work, with means associated with said pilot means for clamping to the work, and with means for thereafter advancing the drills into the work in predetermined positions with respect to said pilot hole.

A further object is to provide such a power drill wherein there is associated with said pilot means an expansive collet which is clampingly engageable with the work.

The drill of the invention, considered broadly, provides a drill body mounting one or a plurality of axially fixed rotary drill spindles, and a motor for driving these spindles, in combination with a work engaging foot arranged for movement toward and from this body. In addition, there is a work securing means for clamping the work to the foot. In a preferred embodiment, this work securing means comprises a draw bar shaft formed at its end with a pilot element adapted to be inserted through a pilot hole in the work, and an expansive, normally contracted collet surrounding this shaft. After insertion of the pilot element and collet through the pilot hole in the work, it is retracted, and in so doing, expands the collet to a diameter larger than that of the pilot hole. The pilot element and the collet then coact to clamp the work to the work engaging foot. The work engaging foot and work securing means, e.g., pilot element and collet, then are relatively moved toward the drill body, with the result that the drills are advanced through the work in predetermined relationship to the pilot hole. If the work is a free piece, the work engaging foot and clamping means are drawn toward the drill body which is held stationary by the operator, the workpiece being, in effect, drawn toward and "through" the drills. If the workpiece is a stationary structural member, the entire drill body, together with the drills carried thereby, is permitted to advance towards the work, the work engaging foot and the securing means in this case remaining stationary.

When drilling metal and the like, it is generally essential to precision work that the rate of feed of the drill through the work be accurately controlled, and that such rate be adjustable to obtain the optimum rate for the particular material to be drilled. Moreover, many times in use of the tool, it is advantageous to both drill and countersink a hole in a single operation. It is well known that the optimum feed rate for countersinking operations is substantially less than that for drilling operations. Accordingly, in combined drilling and countersinking operations, it is essential to a smooth countersink of exact depth that the feed rate of the drill tool be reduced, at the termination of the drilling operation and outset of the countersinking operation, to the optimum value for countersinking and that the depth of penetration of the countersink into the work be susceptible of accurate control.

A further object of the present invention is, therefore, the provision of an adjustable drill tool of the class described which is uniquely adapted to combined drilling and countersinking operations and wherein the feed rate of the tool bit into the work has an initial optimum value for drilling operations and which rate is automatically reduced, in response to predetermined penetration of the bit into the work, to an optimum value for countersinking.

Yet a further object is the provision of an adjustable drill tool of the class described which is accurately responsive to predetermined penetration of the tool bit into the work to immediately terminate advancing of the bit into the work and cause automatic retraction of the bit from the work.

In the aspect of the invention dealing with drilling of holes at predetermined adjustable distances from a previously drilled hole, the following features are broadly pertinent. The drill body is formed to define a pneumatic cylinder, parallel to the drill spindle axis and offset therefrom, and axially movable in this cylinder is a piston actuated shaft which projects from the forward end of the drill body. Fixed to the forward end of this shaft is a radial arm which mounts at its free end a bearing post extending forwardly from the arm and in parallelism with the shaft. An expansive collet, concentric with the post, extends forwardly of the latter for registering in a predrilled hole in a workpiece.

The radial arm and bearing post constitute, in effect, a crank-like arrangement which, together with the collet, may be rotated about the axis of the cylinder as a center to vary the transverse spacing between the collet axis and the axis of an axially fixed, rotary drill spindle journalled in the drill body in spaced parallel relationship to the axis of the cylinder and projecting from the forward end of said body. The drill spindle includes a forward cutting bit having an enlarged cylindrical bearing portion rearwardly of its fluted zone.

A work engaging spacer foot, having a forward work engaging surface and spaced parallel bores for removabl receipt over said bearing post and bearing portion of the tool bit, serves to establish a fixed spacing between the axes of the spindle and collet. This spacer foot may be extensible to provide for progressive adjustment of the spacing between the collet and spindle, or may be fixed to establish one or more preset spacings between the collet and spindle.

Automatic sequential control means, responsive to depression of a manual actuating trigger on the drill body, are operative to cause expansion of the collet in a predrilled hole in the workpiece, to effect clamping of the spacer foot to the work; relative retraction of the foot and work clamped thereto toward the drill body and penetration of the tool bit into the work at an accurately controlled feed rate; controlled reduction of said feed rate in response to a first predetermined penetration of the bit into the work; and, upon an additional predetermined increment of penetration, discontinuance of bit rotation and relative extension of the spacer foot and work fixed thereto away from the drill body to retract the bit from the work.

The invention will be better understood from the following detailed description of certain present illustrative embodiments thereof, reference for this purpose being had to the accompanying drawings, in which.

Figures 2, 2A, 3:
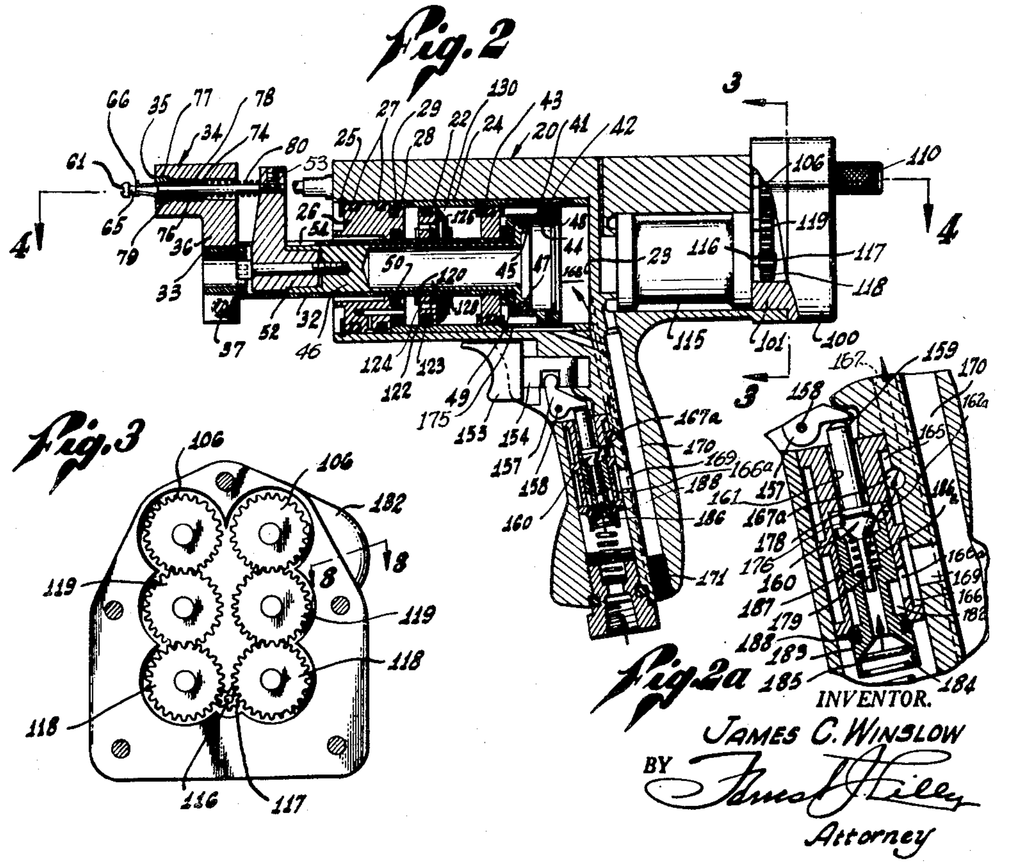
Fig. 2 is a longitudinal vertical section taken on line 2—2 of Fig. 1, the parts being in the same position as in Fig. 1.
Figure 4:
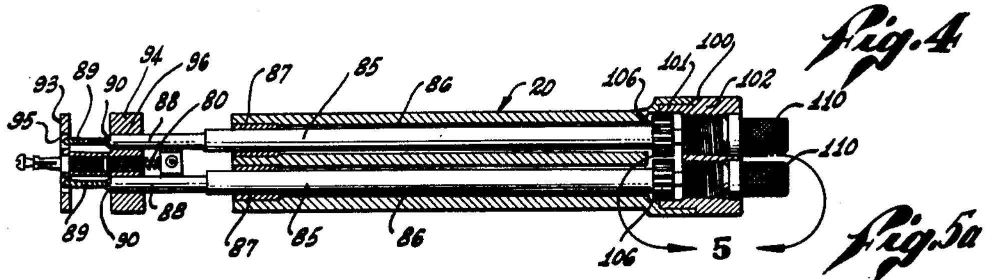
Figures 5, 5A, 6, 7, 8:
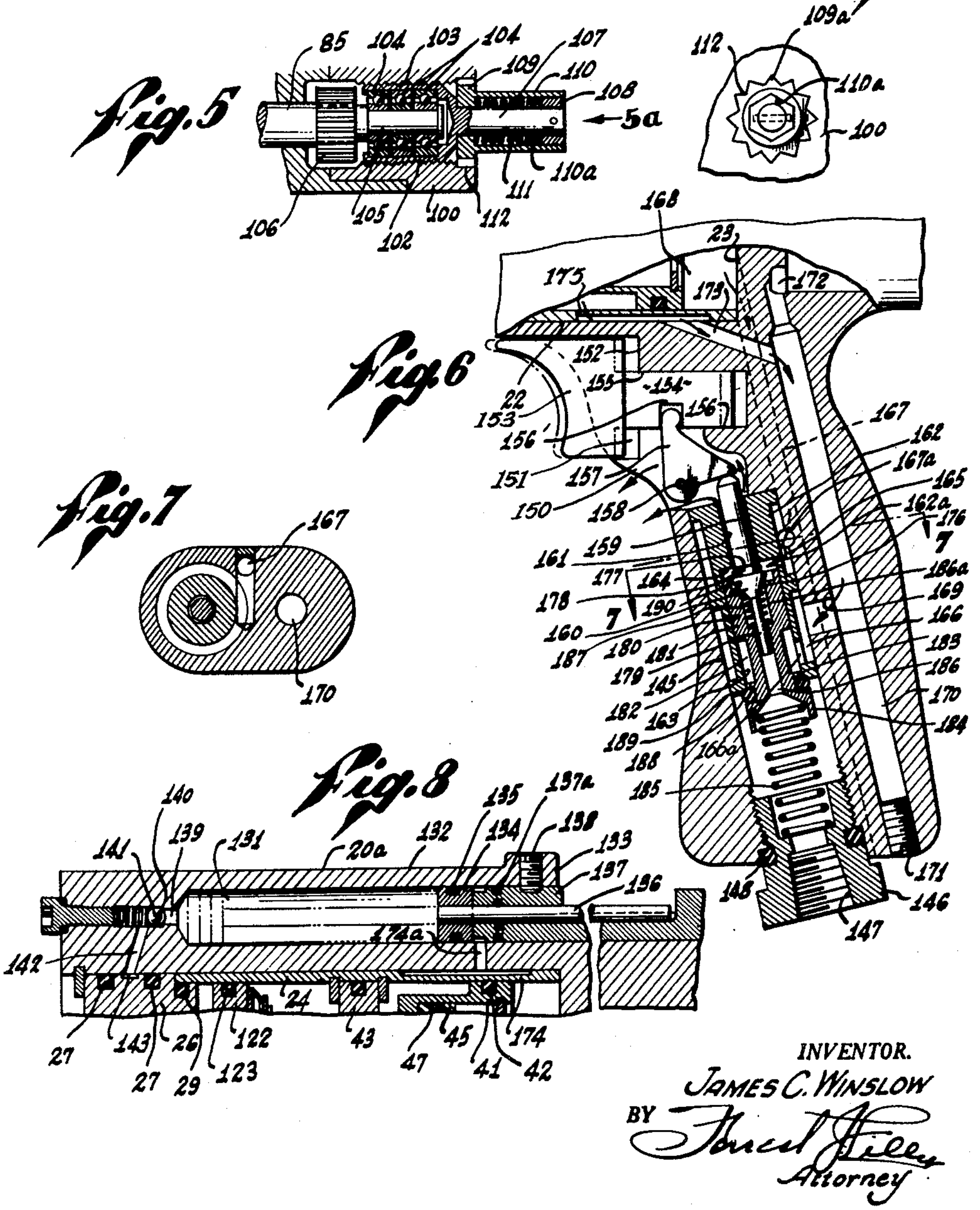
Figures 9, 9A, 10, 11:
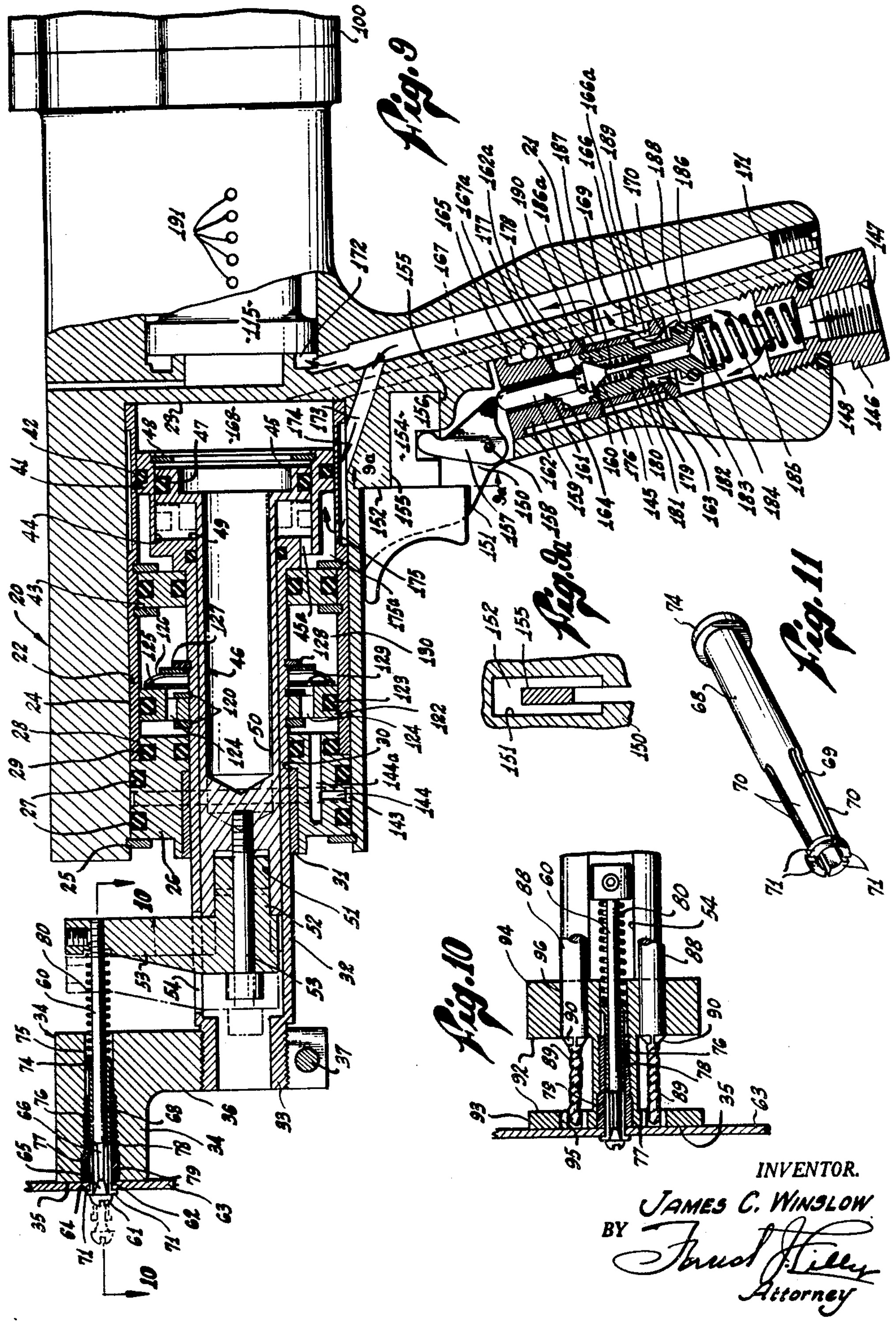
Figure 12:
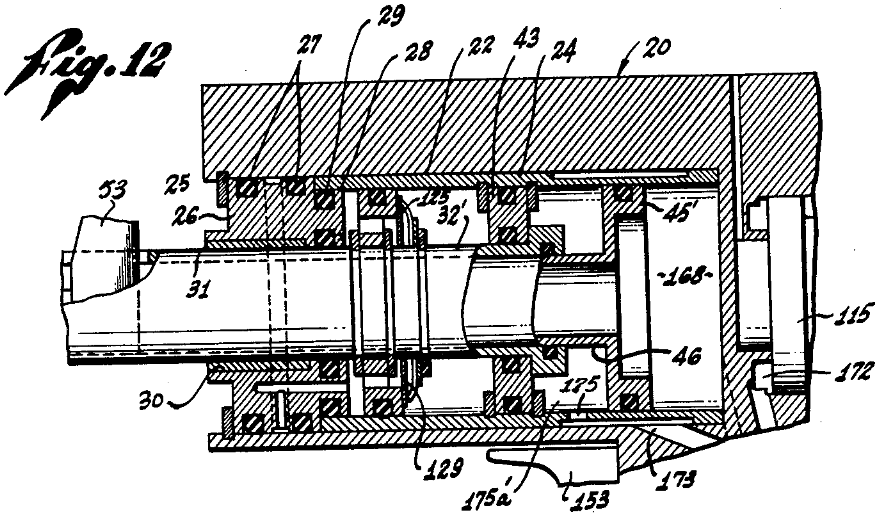
Figure 13:
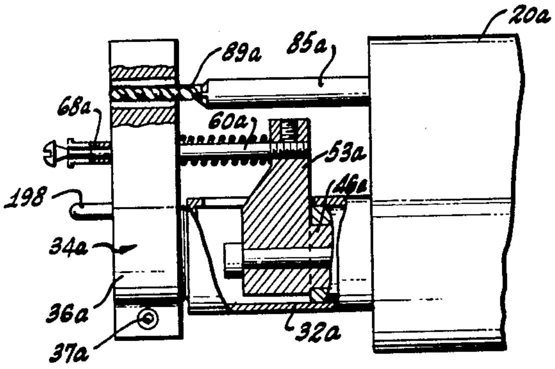
Figure 14:
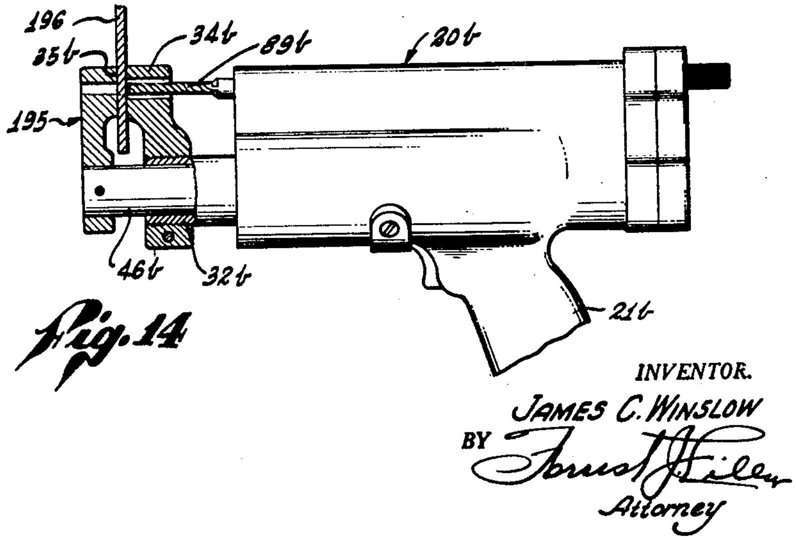
Figures 15, 16, 17, 18, 19:
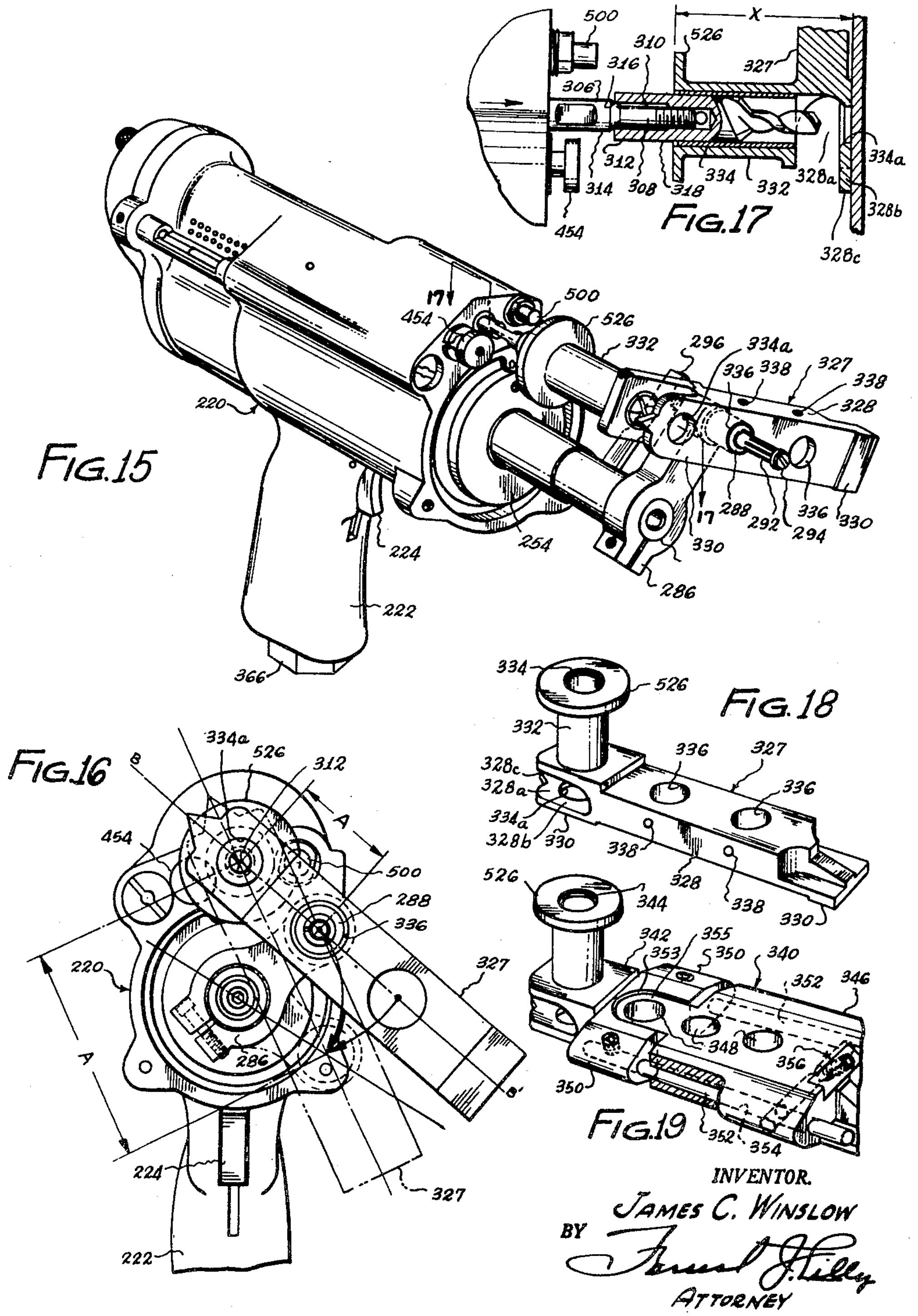

Fig. 2*a* is an enlarged detail taken from Fig. 2;

Fig. 3 is a transverse section taken on line 3—3 of Fig. 2;

Fig. 4 is a horizontal longitudinal section taken on line 4—4 of Fig. 2;

Fig. 5 is an enlarged sectional detail taken within the area 5 of Fig. 4;

Fig. 5*a* is a detail elevational view taken in accordance with the arrow 5*a* of Fig. 5;

Fig. 6 is a view similar to a portion of Fig. 2, but showing a subsequent operating position;

Fig. 7 is a section taken on line 7—7 of Fig. 6;

Fig. 8 is a section taken in accordance with the line 8—8 of Fig. 3;

Fig. 9 is an enlarged view similar to Fig. 2 but showing an operating position subsequent to that of Fig. 6, the control trigger being fully depressed;

Fig. 9*a* is a detail taken on line 9*a*—9*a* of Fig. 9;

Fig. 10 is a section taken on line 10—10 of Fig. 9;

Fig. 11 is a perspective detail of a collet;

Fig. 12 is a detail similar to a portion of Fig. 7 showing an alternative arrangement;

Fig. 13 is a perspective view of the forward portion of a modified drill in accordance with the invention;

Fig. 14 is a side elevational view, partly in section, showing somewhat diagrammatically a further modification;

Fig. 15 is a perspective view of another embodiment of the invention;

Fig. 16 is an enlarged front end view of the tool of Fig. 15;

Fig. 17 is an enlarged section taken along line 17—17 of Fig. 15;

Figs. 18 and 19 are perspective views of spacer feet for use on the tool of Figs. 15–17.

Figures 20, 20A:
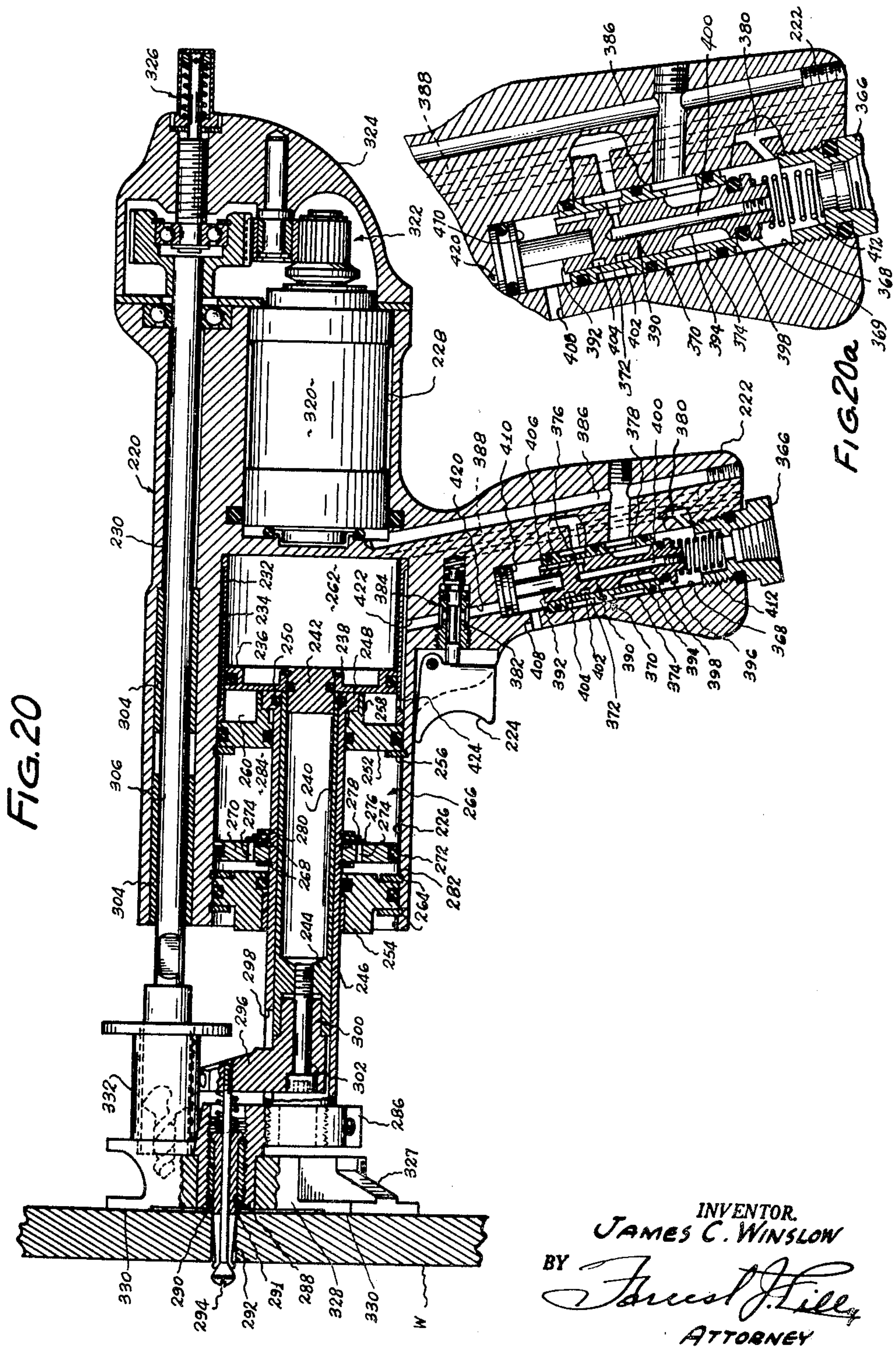
Figure 21:
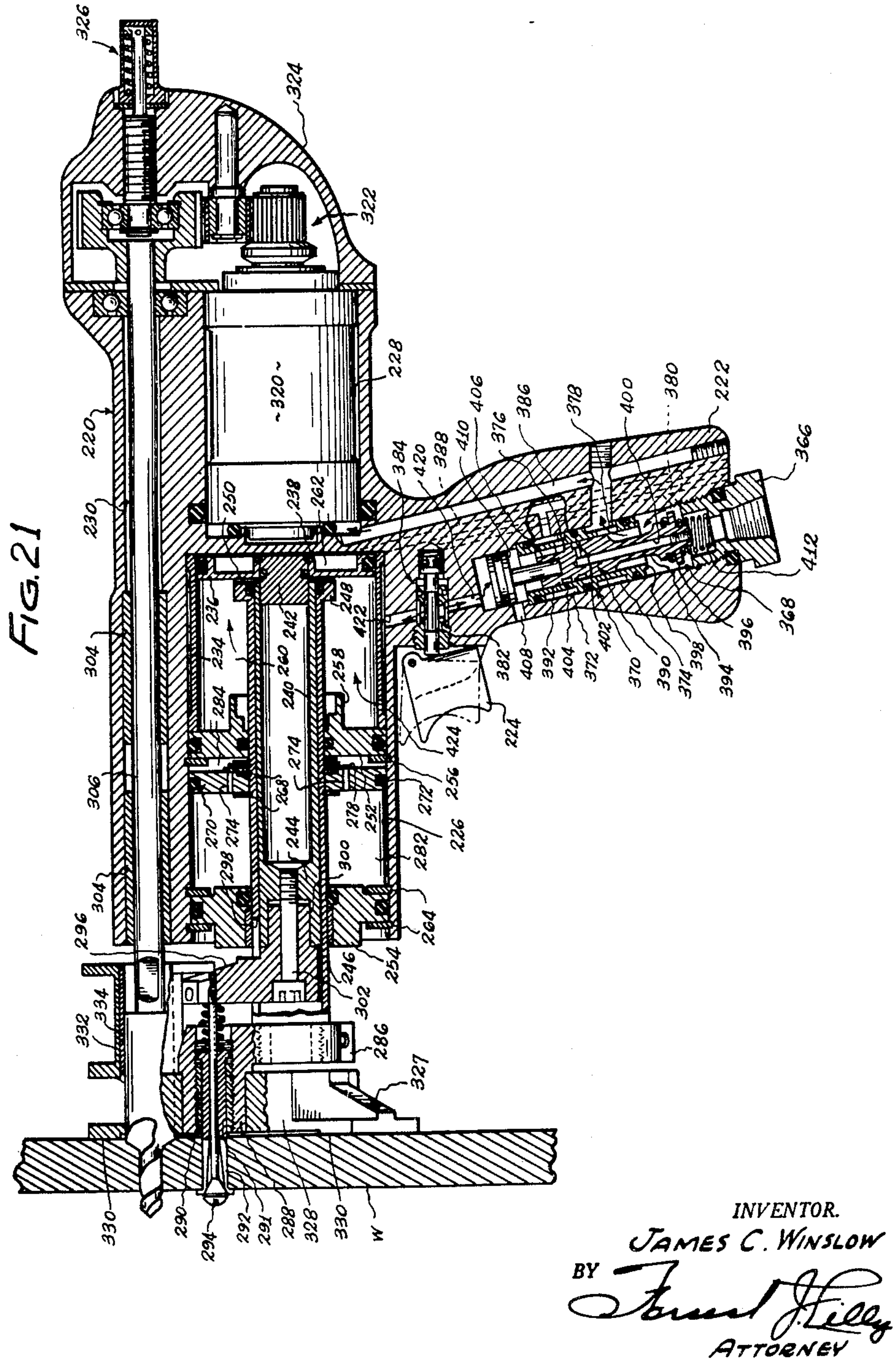
Figures 22, 23, 24, 25:
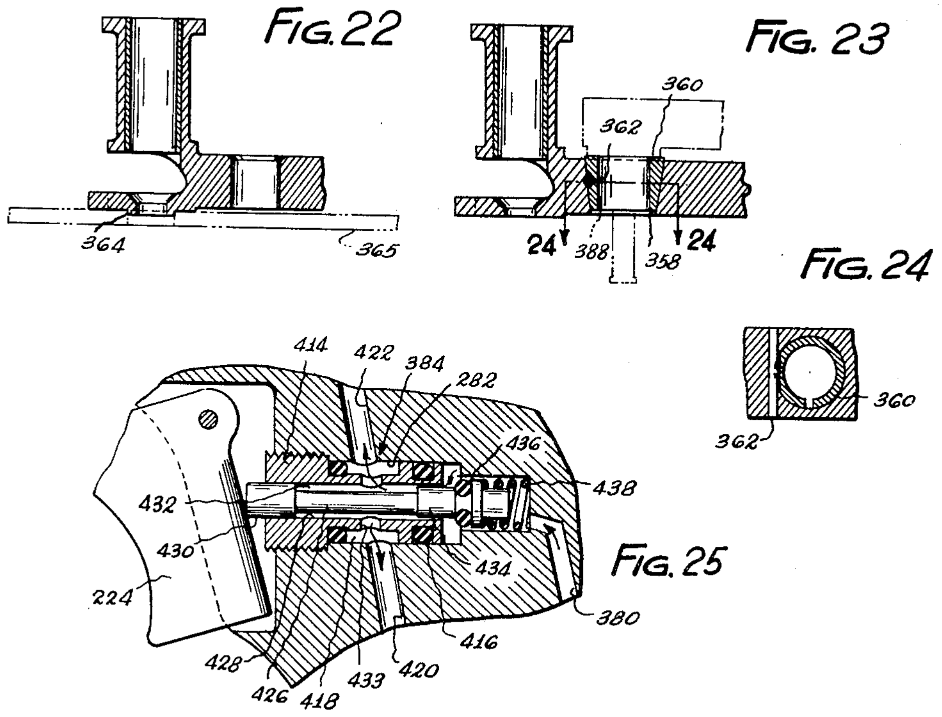
Figure 26:
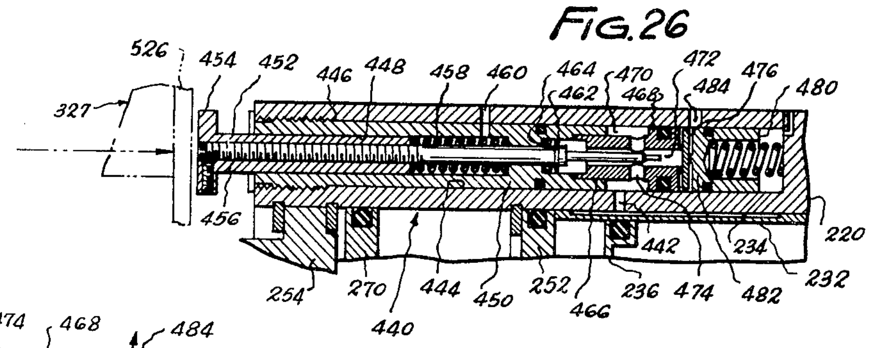
Figure 27:
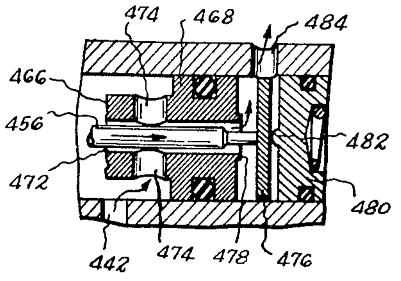
Figures 28, 29, 30, 31, 32, 33:
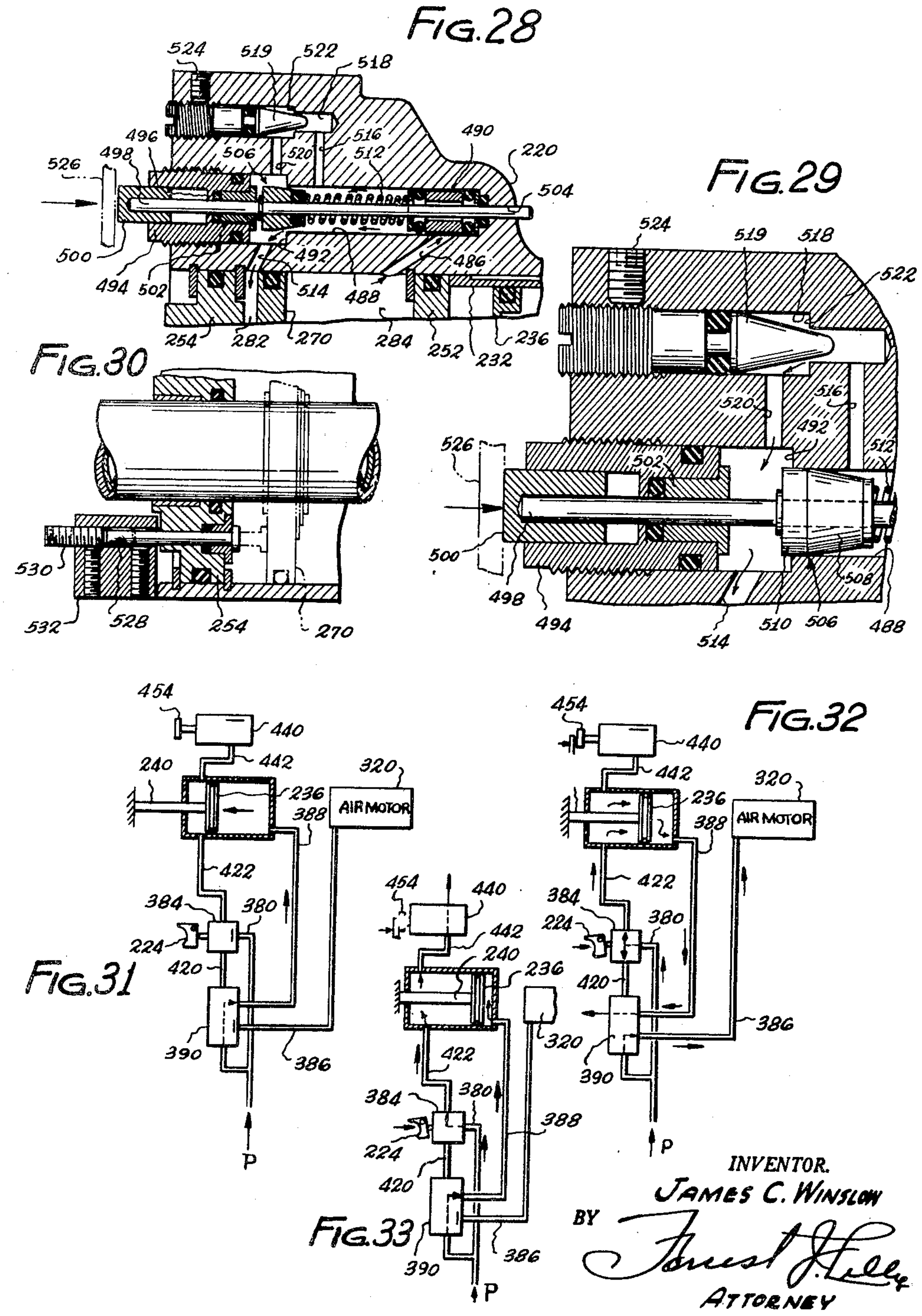

Fig. 20 is an enlarged section taken longitudinally through the present drill tool illustrating the pneumatic control system embodied therein in normal inoperative condition;

Fig. 21 is a view similar to Fig. 6 illustrating the pneumatic control system in one condition of operation;

Figs. 22 and 23 are sections through modified forms of spacer feet for use on the present drill tool;

Fig. 24 is a section taken along line 24—24 of Fig. 23;

Fig. 25 is an enlarged section illustrating certain manual, pilot valve mechanism embodied in the pneumatic system of Figs. 20 and 21;

Fig. 26 is an enlarged section illustrating certain depth control mechanism embodied in the present drill tool;

Fig. 27 is an enlarged showing of an area designated by the arrow 27 in Fig. 26;

Figs. 28 and 29 are enlarged sections illustrating certain differential feed rate mechanism of the invention in two different conditions of operation;

Fig. 30 illustrates a stroke limiting stop which may be incorporated into the present drill tool; and Figs. 31–33 are schematic diagrams illustrating the operation of the present drill tool.

The drill of the invention will be described first in an illustrative form adapted for drilling the two rivet holes for a conventional nut plate. As shown in Figs. 1–11, the drill comprises an elongated aluminum body 20 formed with the pistol-grip handle 21. Extending into the forward end of this body 20 is a large bore 22 terminating at a transverse wall surface 23, and receivable therein is a liner barrel 24 bottoming against surface 23 and terminating somewhat short of the forward end of the bore, as shown. In the forward end portion of bore 22, and positioned by the end of barrel 24 and a snap ring 25, is a wall or partition 26, sealed in bore 22 by sealing rings 27, and provided with a reduced inner portion 28 received within the end portion of barrel 24 and sealed in the latter by sealing ring 29.

Figure 1:
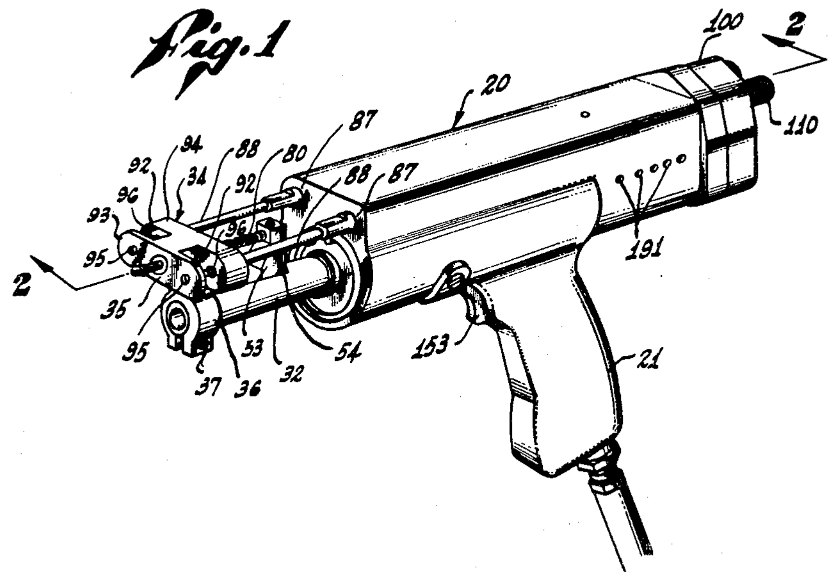
Fig. 1 is a perspective view of a drill in accordance with the invention, the drill being shown in its initial position prior to engagement with the work.

Wall 26 is formed with a central bore 30, lined with a bearing sleeve 31, and slideably received therein is a sleeve 32 whose reduced and externally screw-threaded forward extremity 33 mounts a radial arm 36 carrying a foot 34 having a forward work engaging surface 35 through which project later described drills and pilot and work holding means. As shown in Fig. 1, the hub of arm 36 is in the form of an internally screw-threaded split strap threadedly mounted on the sleeve extremity 33, and tightly clamped thereon by means of clamp screw 37.

The inner end portion of sleeve 32 has integrally formed therewith a piston 41 slideably fitted inside the liner barrel 24 and provided with an O-ring seal 42 to afford an air seal with the inside surface of the liner barrel. The sleeve 32, with its forwardly mounted foot 34 and the described piston 41, is longitudinally movable between the forward limiting position shown in Figs. 2 and 9 and a fully retracted position, not shown, with the piston 41 in abutment with the wall surface 23. The described forward limiting position for the sleeve 32 and associated parts carried thereby is determined by an abutment partition 43 mounted in barrel 24 between snap rings, as shown, and provided with seals both against the inside surface of the barrel 24 and the outside surface of the sleeve 32, all as clearly shown in Fig. 9. This partition 43 is engageable by a shoulder on sleeve 32, as clearly shown in Figs. 2 and 9.

The piston 41 has a bore 44 extending into it from its rearward end, and slideable therein is a piston member 45 on the rearward extremity of a shaft 46 slideable longitudinally inside the bore of sleeve 32, the piston 45 being sealed inside the bore 44 by means of sealing ring 47, and being movable in said bore between a snap ring 48 and the shoulder 49 at the bottom of bore 44. The shaft 46 is preferably bored inward from its rearward end for a considerable distance in interest of lightness, as indicated at 50. A bore 51 is also formed in the forward end portion of shaft 46, and received therein is a shank 52 at the inner end of a radial arm 53 which projects upwardly through a longitudinal guide slot 54 formed in the forward end portion of the sleeve 32, the arm 53 being tightly mounted to the shaft 46 by means of screw 53.

The described upwardly projecting arm 53 carries a pilot means and a means for clamping the work to the head 34. A present preferred embodiment of such means, in accordance with the invention, comprises a pilot head and an expansive collet as now to be described. Mounted tightly in the outer end portion of arm 53 is a draw bar shaft or mandrel 60, extending parallel to the shaft member 46. This shaft 60 projects centrally through the work engaging foot 34, and has at its forward extremity a half-round pilot head 61, of such a diameter as to be capable of being freely inserted, but with close tolerance, through a pilot hole 62 in the structural member 63 (see Fig. 9) to which the nut plate is to be eventually secured. As shown, the half-round head 61 is oriented with its flat side or shoulder 64 facing rearwardly or toward the shaft 60. The shaft 60 has, immediately adjacent head 61, a relatively short, conical, rearwardly tapering portion 65, followed by a slender neck portion 66.

Slideably mounted on shaft 60, behind head 61, is a collet sleeve 68, longitudinally split rearwardly from its forward end, as indicated at 69, so as to form a plurality of resilient fingers 70, here four in number. These spring fingers 70 are bent inwardly so that in the normal inactive or beginning position of the drill, they lie at the base of the conical member 65, in engagement with the reduced neck 66, as in Fig. 2, and they are so designed that when the shaft 60 is subsequently retracted, as to the position shown in full lines in Fig. 9, the spring fingers 70 will be spread by the conical member 65 and will thereupon fill completely the pilot hole 62 in the workpiece 63. It will be seen that the collet sleeve 68, and the fingers 70 thereof when expanded, are of the same diameter as the pilot hole 62. The extremities of the spring fingers 70 are formed with outwardly extending toes in the form of arcuate flanges 71, and in the retracted position of the spring fingers (Fig. 2), the outside diameter of the end of the collect, measured across these flanges 71, is such as permits them to be inserted freely but with close tolerance through the pilot hole 62. When the spring fingers 70 are expanded, however, as they are in the full line position of Fig. 9, the flanges 71 are expanded to a greater diameter than the hole 62, and are engageable rearwardly against the exterior face of the workpiece 63 to hold the same against the forward work engaging face 35 of the foot 34.

The rearward extremity of the collet sleeve 68 is formed with an annular head 74 slideable longitudinally in a bore 75 extending forwardly into foot 34 from its rearward end, in alignment with the shaft 60. The bore 75 is continued in the forward direction by an enlarged threaded section 76, beyond which is a counterbore 77 drilled inwardly from face 35, and a bushing 78, of internal diameter such as to slideably receive collet sleeve 68, is screwed into the threaded bore 76, this bushing having an enlarged head portion 79 received in counterbore 77. A coil spring 80 surrounding shaft 60 between arm 53 and the rearward end of collet sleeve 68 yieldingly urges the latter toward its projected position, with its head 74 in engagement with the end of bushing 78, as shown in Fig. 2. In such position, as previously indicated, the spring fingers of the collet sleeve are contracted, and the pilot head 61 on shaft 60 as well as the flanged end of the collet sleeve are freely insertable through the pilot hole 62 in the workpiece 63. Subsequent retraction of shaft 60 first expands the normally contracted collet fingers 70, so that the diameter of the collet flanges 71 exceeds the diameter of the hole 62; and after pilot head 61 has engaged the forward ends of the fingers 70, further retraction of the shaft 60 moves the collet sleeve 68 against its spring 80 until the flanges 71 engage the forward face of the workpiece 63 and so clamp the latter against the work engaging face 35 of foot 34. The means by which these operations are carried out will be described presently.

Two parallel drill spindles 85 are mounted in two parallel bores 86 extending longitudinally through the upper portion of body 20, being journalled at the forward ends of said bores in bearing bushings 87 (see Fig. 4). Extending from these drill spindles 85 are reduced diameter cylindrical shanks 88, which carry the drill bits 89. In the illustrative embodiment, the bits 89 are formed at their juncture with shanks 88 with countersinks 90, though such countersinks may be optionally omitted in the event that the drill is not to be used for forming countersunk holes. In the illustrative embodiment, the foot 34 is notched on each side, as indicated at 92, to a depth sufficient to clear the bits 89 and shanks 88. The two portions 93 and 94 of the foot 34 thus formed are each provided with aligned drill holes 95 and 96, the former to pass the bits 89, and the holes 96 being adapted to receive the shanks 88 with a free sliding and rotational bearing fit.

The body 20 is provided at its rearward end with a mounting plate 100, secured to the body by any suitable means, not shown, and this mounting plate 100 has a portion 101 snugly received inside a cavity formed in the rearward end portion of the body. This mounting plate 100 has formed therein a pair of screw-threaded bores 102 adapted to receive externally screw-threaded bearing retainer barrels 103 carrying bearings 104 journalling reduced rearward portions 105 of the drill spindles 85 (Fig. 5). The two drill spindles carry spur gears 106 just ahead of bearing retainers 103, and these are driven as to be described shortly.

A pin or stem 107 projects rearwardly from each bearing retainer 103, and to its rearward extremity is pinned a hexagonal member 108. A serrated disk 109 surrounds stem 107 immediately adjacent bearing retainer 104, and the stem 107 is freely rotatable therein. Projecting rearwardly from this disk 109 is a knurled sleeve 110 having a hexagonal opening 110*a* which slideably engages the aforementioned member 108, and a coil compression spring 111 surrounds stem 107 between the member 108 and the disk 109. The disk 109 is formed with serrations 109*a* adapted to mesh with a correspondingly serrated opening 112 in the mounting plate 100 (see Fig. 5*a*). The sleeve 110 is knurled so that it may be gripped and readily manipulated by the fingers of the operator. For purpose of precision adjustment of the longitudinal position of the drill spindles, the sleeve 110 may be drawn rearwardly against the pressure of spring 111 until the serrations 109*a* of the disk 109 are clear of the serrated hole 112, whereupon rotation of the sleeve 110 will rotate the stem 108 and bearing retainer 103. The screw-threaded connection between the latter and the bore 102 in plate 100 results in adjustment of drill spindle 85 in a longitudinal direction.

Positioned in the cavity in the rearward end portion of body 20 is an air motor 115, having a rearwardly projecting drive shaft 116 carrying a pinion 117 which meshes with two spur gears 118 (Fig. 3). These spur gears 118 mesh with idler spur gears 119, which in turn mesh with the aforementioned gears 106 on the drill spindles. The drill spindles are thus driven from air motor 115.

Mounted tightly on sleeve 32 between closure wall 26 and partition 43, between snap rings 120, is a disk 122, which is slideably fitted for longitudinal movement inside the liner barrel 24, and is sealed within by sealing ring 123. Oil holes 124 extend through this disk 122. A thin flat check valve disk 125 is pressed against the rearward face of disk 122 by spring arms 126 of a spider 127 backed up by a snap ring 128 mounted on the sleeve 32. A small oil check orifice 129 is formed in disk 125. The space 130 inside liner barrel 24 between closure disk 28 and the abutment disk 43, on both sides of member 122, is filled with oil, and movement of disk 122 in a longitudinal direction within said chamber is checked by the restricted oil passing orifice 129 when the disk 122 moves inwardly or toward the right, as viewed in Fig. 9. In the reverse direction of travel, the valve disk 125 can separate slightly from the disk 122 to permit unrestricted oil passage therebetween. The disk 125 is thus a spring actuated check valve controlling the oil holes 124, permitting relative free movement of the disk 122 toward the left, but seating against disk 122 with the reverse direction of travel of member 122. In the latter direction of travel, the speed of movement is restricted to that permitted by oil flow through the restricted orifice 129.

Provision is made for maintaining the oil chamber 130 constantly full of oil, and for this purpose, the oil make-up chamber 131 shown in Fig. 8 has been provided. This chamber is in the form of a longitudinal bore 131 extending forwardly into a longitudinally extended lateral protuberance 132 of the gun body, said protuberance terminating rearwardly at a transverse shoulder 133, and bore 131 opening through said shoulder. Slideable in this bore 131 is a plunger 134 fitted with an O-ring seal 135, and the plunger has an indicator stem 136 projecting rearwardly and outwardly of the bore 131 through the centrally bored end portion of a cylindrical member 137 inserted in the rearward end of bore 131 and secured in place by set screw 138, the member 137 being provided with O-ring seal 137*a*. The member 137 is half cut away rearwardly of shoulder 133 to expose the stem 136. The forward end of bore 131 communicates with a reduced passage 139 provided with a seat at 140 for spring pressed check valve ball 141, and beyond said ball 141 is an oil passage 142 communicating with an annular groove 143 around closure disk 26 (see also Fig. 9). A passage 144 extending inward from groove 143 (Fig. 9) communicates with passage 144*a* opening to the oil chamber 130. Depletion of the oil within chamber 130 during service creates a vacuum condition acting to draw oil from the supply chamber. Also, an air passage 174*a* is formed from annular groove 174 around barrel 24 to the space in bore 130 in back of plunger 134, and there being air under pressure in said groove 174 during operation of the drill, this air pressure is conveyed to plunger 134 to move it toward the left, thus creating a pressure tending to force the make-up oil toward the chamber 130.

The pistol grip handle 21 is formed with a longitudinal bore 145 extending upwardly into it from its butt end, the outer end portion of this bore being screw-threaded, as indicated, to receive the screw-threaded inner extremity of a closure plug 146 having an air passage therethrough and threaded as at 147 for connection of an air supply hose, not shown. A sealing ring at 148 affords an air tight closure between this plug 146 and the handle. The bore 145 communicates at its upper end with a slot 150 which extends inwardly into the handle 21 through the upper, inside or forward portion thereof, as shown. A trigger slot 151, of greater thickness than slot 150, extends inwardly into the upper portion of the handle 21 to a shoulder 152, where it meets the slot 150. A trigger 153 works in the slot 151, and has at the rear a shank 154 slideably fitted in a guide slot 155 of the same width as the slot 150, and forming an upper extension of the latter, there being a guide surface at 156 for the lower surface of the shank 154. The lower side of shank 154 has a notch 156′ receiving one arm of a bell crank 157 pivoted at 158 within slot 150, the other arm of which bears on the stem 159 of a shuttle valve member generally designated by the numeral 160.

The stem 159 of valve member 160 is loosely fitted and longitudinally movable within a central bore 161 extending through the upper end portion or head of a tubular member 162 seated tightly in the upper end portion of handle bore 145. A bore 163 extends upwardly into this tubular member 162 to a valve seat shoulder 164 at its juncture with the bore 161. The member 162 has upper and lower annular grooves 165 and 166 extending therearound, the former, connected by an orifice 162*a* with the inner end of bore 163, communicating via a port 167*a* and a passage 167 with the chamber 168 at the inner end of liner barrel 24. The space in the upper end of bore 163 thus communicates constantly with space 168. The groove 166 communicates via a port 169 with a longitudinal bore 170 in the handle parallel to and in back of bore 145. The lower end of this bore 170 is closed by means of plug 171, and its upper end communicates with the air intake port 172 for air motor 115, and, via a branch passage 173, with an annular groove 174 formed around the rearward end portion of the liner barrel 24. This groove 174 communicates with the space 175*a* between the piston member 41 and the abutment 43 by way of a port 175. The groove 166 is thus in constant communication with said space 175*a*.

The valve member 160 has a conical valve element 176 just below the lower end of stem 159, and between this conical valve element and stem 159 is a reduced neck portion 177 on which is seated a sealing element 178, preferably a synthetic rubber O-ring. Below valve element 176 is a reduced downwardly extending stem 179. In the inoperative position, prior to actuation of the trigger, the valve 160 is in its uppermost position, as in Figs. 2 and 2*a*; and in such position, O-ring seal 178 engages shoulder 164 and forms an air tight seal to prevent air from escaping longitudinally along bore 161 around the outside of pin 159 to the slot and thence to atmosphere, so as to prevent exhausting air from chamber 168.

A valve spool 180 has an upper tubular head portion 181 slideably disposed in the bore 163 of member 162, and below said member 181 is an annular groove 182, below which is an enlarged lower head 183 formed at the lower end with a cup 184 engaged by the upper end of a coil compression spring 185 seated within closure plug 146. A central bore 186 extends upwardly through valve spool 180, its upper end portion being enlarged, as at 186*a*, for accommodation of a small compression spring 187 which urges the valve member 160 to its uppermost position, as in Figs. 2 and 2*a*. The stem 179 of valve 160 fits loosely in the bore 186. Valve spool head 183 carries a sealing ring 188, preferably a synthetic rubber O-ring, which is adapted to seat on conical valve seat 189 at the lower end of tubular member 162 when the valve spool is in its uppermost position, as in Figs. 2, 2*a* and 6. In this position of the valve spool, its groove 182 is closed off from the supply of pressure air from the hose. When the valve spool is lowered (Fig. 9), the air from the hose enters groove 182 past valve seat 189, and from there passes through orifice 166*a* to reach groove 166, from which it flows as previously traced to power the air motor and enter the chamber 175*a*. Spring 185 normally holds valve spool 180 in the position indicated in Figs. 2 and 2*a*, with the sealing ring 188 in engagement with seat 189, this engagement limiting upward travel of the valve spool. In this position of the mechanism, the spring 187 holds the valve member 160 with its conical valve element 176 spaced slightly above its annular valve seat 190 at the upper end of bore 186*a*, so that pressure air is communicated to chamber 168. A plurality of air discharge holes 191 in valve body 20 discharges air from the exhaust outlet of the air motor.

The operation of the drill is as follows: the parts stand normally in the position shown in Figs. 2, 2*a* and 4. At this time, air entering through the hose (not shown) connected to the lower end of the pistol-grip handle passes upwardly through bore 186 in valve spool 180, past valve element 176 (then lifted by spring 187 above its seat 190 at the upper end of valve spool 180), and thence via port 162a, groove 165, and passage 167 to the chamber 168, the pressure developed in the latter acting on pistons 41 and 45 to move them, and the sleeve 32 and shaft 46 respectively connected thereto, to the extended positions shown in Fig. 2. The work engaging foot 34 carried by the carriage comprised of sleeve 32, and the shaft 60 and pilot head 61 carried by the carriage comprised of shaft 46 and arm 53, thus are in their fully extended positions. At this time, the valve member 160 is being pressed upwardly by its spring 187 to cause seal ring 178 to effect a seal against air escaping through bore 161 around the loose fitting valve stem 159. Also, the incoming air is sealed at 188 against passage into groove 182 and thence via port 166a, groove 166 and port 169 to the passage 170 leading to the air motor and to the space 175a between piston 41 and abutment 43. To engage the device with the work, the pilot head 61 is inserted through the pilot hole 62 in the structural member 63 to be drilled, and when this has been done, the trigger 53 is pulled rearwardly by the index finger of the hand of the operator gripping the handle 21. When the trigger has been retracted to the intermediate position shown in Fig. 6, the bell crank 157 has depressed valve 160 so as to unseat sealing ring 178 from shoulder 164 (Fig. 6), and the conical valve element is moved down into seating engagement with its valve seat 190. Accordingly, pressurized air from chamber 168 is exhausted via passageway 167, port 167a, groove 165, orifice 162a and bore 161 to the notch 150 which is open to atmosphere. At the same time, air under pressure entering from the hose is valved off from flowing to chamber 168 and also from escape through bore 161 by conical valve element 176 seating at 190. Any air under pressure trapped within chamber 168 has thus been exhausted.

Further retraction of trigger 153, as to the position shown in full lines in Fig. 9, results in further depression of valve stem 159, causing conical valve element 176 to move the valve spool 180 downward against spring 185 and so unseat the sealing ring 188 carried by the valve spool from the valve seat 189. Accordingly, pressure air introduced via the air hose then passes upwardly past valve seat 189 to groove 182, thence via orifice 166a to groove 166, and then by way of port 169 to passageway 170 leading to air motor intake port 172, whereby the air motor is operated to drive the drill spindles. Air under pressure is also thereby delivered from passage 170 through passage 173, groove 174 and port 175 to the space 175a between abutment 43 and piston 41. A force is accordingly produced on piston 41 tending to move it and the work foot 34 rearwardly, or toward the right as viewed in the drawings. Such movement, however, is retarded by reason of the liquid within the chamber 130, and the necessity for this liquid to pass through the small oil check orifice 129 to the space between the piston 122 and the fixed closure member 28, This air acting on piston 41, however, also acts on piston 45 by way of a port 45a, and piston 45 moves instantly toward the right to the position shown in full lines in Fig. 9, retracting the shaft 46, arm 53 and pilot shaft 60 and its head 61 from the initial position shown in dot-dash lines in Fig. 9 to the position shown in full lines in said figure. In the course of this last-mentioned action, the normally contracted spring collet fingers 70 are cammed radially outwardly by the conical member 65 on shaft 60 to the expanded position shown in full lines in Figs. 9 and 10. The conical member 65 first acts to expand the spring fingers 70, the collet spring 80 being of sufficient strength to at such time hold the collet in its advanced position. As the spring fingers reach their fully expanded position, their outwardly flanged ends are engaged by the pilot head 61 and are then moved thereby rearwardly toward the workpiece 63, the collet moving inwardly in bushing 78 against spring 80, with collet head 74 separating from the end of bushing 78, as shown. The outwardly turned flanges 71 thus are expanded to a larger diameter than the hole in the work piece, so that they may engage the workpiece around the margins of said hole. The head 61, engaged against the flanges 71 of the collet, forces the latter against the outer surface of the workpiece, which thus becomes clamped against the face 35 of foot 34. It will be seen that the workpiece is thus tightly clamped to the foot 34 by pneumatic pressure acting on the piston 45.

The piston 41 and sleeve 32 carrying the work engaging foot 34, and constituting a carriage means therefor, and the piston 45 and shaft 46 carrying the pilot shaft and collet, constituting a carriage means for these latter elements, then move as a unit slowly inwardly, or further toward the right, as viewed in the figures, at a speed determined by the hydraulic check at 129, it being noted that the pressurized air continues to act toward the right on piston 45 so that the latter and parts carried thereby move as permitted by the movement of piston 41, sleeve 32, and foot 34 toward the body 20 while the two holes are bored through the workpiece 63 by the drills 89. If the workpiece 63 is a stationarily mounted member, the body 20 and the drills 89 are of course drawn towards the workpiece.

In the event that the holes to be drilled are to be countersunk, the drills 89 may be furnished with the countersunk elements 91, as previously described. Particularly when such countersunk elements are employed, the longitudinal adjustability of the drill spindles with reference to the body 20 accomplished by means of the knurled sleeves 110, as heretofore described, is a feature of prime importance.

When the holes have been thus drilled, the trigger is released. Thereupon, valve spool 180 is returned to the position of Figs. 1 and 2 by spring 185, and valve member 160 to the position of Fig. 2 by spring 189. With the valves in such position, air from the pressure supply hose is again supplied to chamber 168, through the passageways previously described, with the result that the pistons 41 and 45 are moved outwardly so as to carry the parts back to the position of Fig. 2. In this latter movement, the piston 41 moves freely and without hydraulic check, in view of the fact that the disk 125 functions as a spring pressed check valve, and unseats for this direction of movement to permit substantially unrestricted liquid flow through the ports 124 for this direction of travel. The parts are thus carried back to the position of Fig. 2, almost instantly, so that the workpiece is disengaged from the drills, the pilot head 61 is moved forwardly relative to the work head 34, and the collet 68 returns to its contracted position of Fig. 2 so as to release the work. If there is no work in position when the trigger is pulled, the rearward travel of the shaft 46 is stopped by arm 53 engaging the end of slot 54.

Fig. 12 is a view similar to a portion of Fig. 7 showing a preferred, simplified alternative arrangement which may be used in the drill of Figs. 1–11. In this case, no piston such as the piston 41 of Figs. 1–11 is used on the sleeve 32, and the piston 45' is enlarged to fit the liner barrel 24. Otherwise, the parts are the same, and are identified by the same reference numerals employed in Figs. 1–11. Here, the pressure air in chamber 168 moves the piston 45' and its shaft 46 (constituting the carriage means for the work securing means) and parts carried by the latter to their extended position, and the piston 45' in engagement with the end of sleeve 32' moves the latter (which constitutes a carriage means for the work engaging foot) to the extended position. During use of the drill, the pressure air delivered to chamber 175a' acts first to move piston 45', the shaft 46, and the pilot shaft and collet understood to be carried thereby to clamp the work against the work engaging foot; and after such clamping, the air pressure acting against this same piston 45' serves to move the work foot and the sleeve 32 slowly rearwardly, under control of the hydraulic check at 129, it being understood that once the work has been engaged by the expanded collet and clamped against the work foot, any subsequent retractive movement of the collet and pilot shaft carried by the shaft 46 connected to piston 45' will be imparted to the work foot and to sleeve 32'. Accordingly, after such engagement of the work and its clamping against the work foot, the single piston 45' fulfills the additional function of retracting the work foot and sleeve 32'. The resulting movement of the two assemblies as a unit is controlled in speed, as before, by the hydraulic check at 192.

Fig. 13 indicates the possibility of reorganizing the drill of the invention to adapt it for applications other than to preparation for nut plate mounting. In this case, a single drill spindle is provided, and below this is the pilot shaft and collet, while below the latter is a fixed pilot pin, the distances between the longitudinal axes of the drill and the pilot shaft and collet being equal to the distance from the longitudinal axis of the pilot shaft and collet to that of the fixed pilot pin. The purpose of such a drill is to drill a long row of drill holes at uniform spacing. Assuming two such holes to have been drilled, the fixed pilot pin is engaged with one of such holes, the pilot and collet assembly is engaged with the next hole, and the drill spindle then drills a third hole at uniform spacing to the first two holes and in line therewith. As shown, the drill body 20*a* has projecting from its forward end a sleeve 32*a*, corresponding to the sleeve 32 of the first described embodiment, and this sleeve carries work foot 34*a*. A single drill spindle 85*a* extends from body 20*a* and carries drill 89*a* operating through a suitable hole in the work foot. In this case, the single drill spindle is in the vertical central longitudinal plane of the drill, and suitable reorganization of the drill of Figs. 1–11 to accomplish this design change is well within the skill common in the art, no further illustration therefore being deemed necessary. Pilot shaft 60*a*, positioned directly below the drill spindle, is carried by arm 53*a* mounted on a shaft 46*a* within sleeve 32*a*. A collet 68*a* like the collet 68 of the first embodiment is associated with the pilot shaft in exactly similar manner as before. A fixed pilot pin 198 is mounted on foot 34*a* directly below the pilot shaft, as shown, the center-to-center spacings of the drill, pilot shaft, and fixed pilot pin being uniform. The device is used to drill a succession of uniformly spaced holes as described in the early portion of this paragraph. The internal mechanism and its operation are identical with that of the first described embodiment, save only for necessary design reorganization necessary to place the drill spindle and pilot shaft in vertical alignment, and such being within the capabilities of those skilled in the art, no further illustration or description is deemed necessary. Also, for some purposes, the fixed pilot pin of Fig. 13 may be omitted.

Fig. 14 shows still another modification, employing a foot clamp for clamping the work to the work foot, in place of the pilot and collet assembly of the first described embodiments. The gun body 20*b*, its pistol-grip handle 21*b*, and all internal mechanism may be identical with that of the first described embodiment. Thus, projecting from the forward end of the gun body is a sleeve 32*b* which will be understood to correspond to the sleeve 32 of the first described embodiment, and this sleeve 32*b* mounts work foot 34*b* having work engaging face 35*b* and furnished with holes for one or more drills 89*b* understood to be on the forward ends of drill spindles like the spindle 85 of the first described embodiment and driven in similar manner. The shaft designated by numeral 46*b* corresponds with the shaft 46 of the first embodiment, but in this case projects forwardly from the forward end of sleeve 32*b*, and mounts at its forward extremity a clamping foot 195, which takes the place of the pilot shaft and collet of the first described embodiment. In the operation of the device of Fig. 13, actuation of the trigger retracts the shaft 46*b* and foot 195 to clamp the workpiece 196 against the face 35*b* of foot 34*b*. This action corresponds with the retraction of the pilot shaft 60 in the first described embodiment. The workpiece being clamped, the work engaging foot 34*b* and the clamp foot 195 are together slowly retracted, or moved toward the body 20*b*, thus pulling the work toward and "through" the drills. Or, if the workpiece is stationary, the body 20*b* is advanced toward the work, moving the drills 89*b* slowly through it. It will be seen that the movement of the foot 34*b* and clamping foot 195 toward the body 20*b* in this last described phase of operation corresponds precisely with the operation of the first described embodiment. The internal mechanism and the complete operation being exactly identical, no further description is believed necessary.

A present illustrative embodiment of the invention, in a form for drilling holes in adjustable spaced relationship, shown in Figs. 15 to 30, comprises a hollow, generally cylindrical drill body 220 intermediately formed with a projecting pistol-grip handle 222 mounting a pivoted trigger 224 movable in a slot in and projecting from the forward face of the handle.

Body 220, which may comprise a casting, has a first cylinder or cylindrical recess 226 formed therein and opening through the forward end thereof, a second cylindrical recess 228 opening through the rear end thereof, and a drill spindle bore 230 extending therethrough in axial parallelism with the cylindrical recess 226.

Frictionally received in and bottoming in recess 226 is a sleeve or cylinder 232 having its outer surface peripherally grooved to provide an annular space 234 between the sleeve and the wall of recess 226 and having its inner surface smooth for slideably receiving a piston 236 including a peripheral O-ring, shown, providing a fluid tight seal between the sleeve and piston. Piston 236 is fixed, as by a snap ring 238, on the reduced inner end of a piston rod 240 which may be generally tubular in construction, as illustrated, and have one end thereof closed by a plug 242, mounting the piston, and an internal, transverse wall 244 spaced from the outer end thereof.

Piston rod 240 is slideable in an outer sleeve or cylindrically bored shaft 246 including an enlarged, internally grooved shoulder 248 at one end for receiving an O-ring seal 250 between the sleeve and piston rod. The outer sleeve 246 is mounted for axial sliding movement in central bores in a pair of spaced circular partition walls 252 and 254, O-rings providing fluid seals between the partition walls and sleeve 246, as shown. The inner one 252 of these walls seats against the forward end of cylinder sleeve 232 and is retained in position by a snap ring 256 engaging in a groove in the wall of recess 226. This wall 252 has a central, rearwardly projecting annular flange 258 against which the shoulder 248 on sleeve 246 is adapted to abut for limiting forward travel of the sleeve 246, the piston 236, and the piston rod 240.

The space or chamber between inner partition wall 252 and piston 236, into which air under pressure is admitted to produce rearward retractile movement of the piston, as will be presently explained, has been designated by numeral 260 and the space between the piston 236 and the end wall of recess 226, into which pressure air is admitted to produce forward extensile movement of the piston, has been designated by numeral 262.

The forward or outer partition wall 254 is disposed adjacent to and closes the open forward end of recess 226 and is retained in position by a pair of snap rings 264 at opposite sides thereof engaging in grooves in the wall of the recess. Both partition walls are peripherally sealed to the wall of recess 226 by the O-rings shown so as to form chamber 266 between the walls which is filled with oil.

Positioned on sleeve 246 within chamber 266, and retained against axial movement on the sleeve by snap rings 268 engaging in grooves in the sleeve, is a piston 270 peripherally carrying an O-ring 72 providing a sliding seal between the piston and wall of recess 226. Chamber 266 and piston 270 provide, in effect, a dashpot for restricting or controlling feed rate in the present tool, as will be explained. To this end the piston 270 has a series of ports 274 extending therethrough which are normally sealed at their rear ends by a valve disk 276 that is resiliently biased into flat engagement with the rear face of piston 270 by a resilient spider 278 backed up by a snap ring 280. Spider 278 may be like spider 126 of Figs. 1–11, or of any other type capable of resilient flattening under compression. During forward movement of the piston 270 in chamber 266, the increase in pressure of the oil in the chamber space 282 at the forward side piston 270 will cause unseating of the valve disk 276 against the action of spider 278 so that oil may flow from said space 282, through ports 274, to the chamber space 284 at the rear side of piston 270. The size of ports 274 is such as to accommodate relatively rapid movement of the piston 270 in this direction. During reverse, or rearward movement of piston 270 in chamber 266, however, the valve disk 276 will act to seal the ports 274, the oil in space 284 flowing through passage means, to be described, including adjustable restriction means, to the space 282 at the forward side of piston 270. These restriction means serve to control the rate of said rearward movement of the piston 270, and, hence, the feed rate as will be hereinafter explained.

Sleeve 246 has a reduced, threaded forward end extended externally of drill body 220, and rigidly fixed on this end is a radical arm 286. The free end of arm 286 is formed with a forwardly extending cylindrical extension or bearing post 288 which is preferably hardened. Bearing post 288 and arm 286 have a bore 290 extending therethrough in parallelism with the axis of sleeve 246, an intermediate portion of the bore being threaded for threaded engagement with a collet bushing 291 in which is slidable an expansive collet 292 which projects a distance beyond the forward end face of bearing post 288.

Extending through collet 292 is a pilot means and collet expander 294 having its rear end fixed in a second radial arm 296 which extends through an elongated slot 298 in sleeve 246 and has a cylindrical extension 300 received in the forward end of the piston rod 240. A bolt 302, threaded in the piston rod internal wall 244, serves to secure the arm 296 to the rod. The length of slot 298 is sufficient to accommodate limited axial movement of the piston rod 240 and arm 296 carried thereby relative to the sleeve 246 to expand and contract the collet 292. This collet and collet expansion arrangement is substantially identical to that of the first described embodiment of the invention.

The forward end portion of spindle bore 230 is radially enlarged, as shown, for receiving bearing sleeves 304 which journal therein a rotary drill spindle 306 extending through the spindle bore 230 in parallelism with the common axis of sleeve 246, piston rod 240 and piston 236. The forward end of this spindle extends a distance beyond the forward end of the drill body and has a reduced terminally threaded extension 308 (Fig. 17) received in an axial bore 310 in a tool bit 312.

Shoulder 314 at the rear end of spindle extension 308 is tapered, as shown, for seating in a tapered recess 316 at the rear end of the tool bit, the bore 310 in the latter having a diameter slightly larger than the spindle extension 308 and terminating in a reduced forward threaded extension having the threaded end of the spindle extension engaged therein. Accordingly, spaced two-point support of the tool bit on the drill spindle is provided resulting in a rigid and accurately concentric attachment of the bit and spindle. The rear end portion 318 of the bit is enlarged relative to its fluted cutting end, as shown, and is precision ground for journalling in a drill bushing, as will be seen.

The after end of the drill spindle 306 is adapted to be driven in rotation from an air motor 320, housed in the drill body recess 228, through gearing 322 enclosed by a hollow cap 324 secured to the after end of the drill body. The spindle may be axially adjusted relative to the drill body by spindle adjusting means 326. This gearing and spindle adjusting means is substantially identical to that of the first described embodiment.

From the description thus far of the present drill tool, it will be seen that with the collet 292 engaged in a predrilled hole in a workpiece, the spacing, designated as "A" in Fig. 16, between that hole and the hole produced by the bit 312 will be determined by the distance between the axis of the collet and the axis of the bit. It will be further seen that this distance may be varied, to obtain a different hole spacing, by rotation of radial arm 286 about the axis of sleeve 246, as may be seen from Fig. 16. This rotation of the arm 286 will, of course, carry with it sleeve 246, arm 296 and piston rod 240.

To retain a given distance or spacing between the collet and tool bit and/or to accurately fix this distance at an exact predetermined value, the present invention makes use of a work-engaging spacer foot 327 having a bore for receiving the bearing post 288 and a drill bushing parallel to and spaced from said bore for receiving the bearing portion 118 of the tool bit. In one form of spacer foot, shown in Figs. 15, 16, 18 and 22, the spacing between the bore and bushing is fixed at an exact predetermined value while in another form of spacer foot, Fig. 19, said spacing is adjustable, as will be seen.

The spacer foot of Figs. 15, 16 and 18 comprises a rigid bar member 328 generally rectangular in plan, having the work engaging face thereof centrally relieved to provide spaced coplanar work engaging face portions 330 at opposite ends thereof. One end of the member is formed to provide an upstanding cylindrical bearing boss 332 extending perpendicular to the adjacent work engaging face and having its lower end, as viewed in the figure, spaced above the end portion of the member having said adjacent face formed thereon. The boss 332 is through bored for frictionally receiving a drill bushing 334 and said latter end portion of the member is bored and countersunk, as shown at 334*a*, in axial alignment with the drill bushing.

A bore 336 extends through the member 328 in accurately spaced parallel relationship to the drill bushing 334, the spacing between the axes of the bushing 334 and bore 336 being made a desired value in accordance with the desired center distance spacing between holes to be drilled. In use, the radial arm 286 is rotatably adjusted, as previously described, to make the spacing "A" between the axis of the bearing post 288 and drill spindle 306 correspond approximately to the spacing between the bushing 334 and bore 336 in the spacer foot. The spacer foot is then positioned on the drill tool, as shown in Figs. 15 and 16, with bearing post 288 received in bore 336 and the bearing portion 318 of the tool bit 312 received in the drill bushing 334. One means of securing the foot to the post 288 is by way of a set screw 338. An alternative fastening arrangement, shown in Fig. 23, will be described.

If desired, the spacer foot may have only one bearing post receiving bore 336 formed therein at a fixed distance from bushing 334, and a plurality of spacer feet, having different present values for said distance, may be provided for use with the present tool so as to provide for drilling of holes with different center distances. Or, each spacer foot may have a series of bores 336 at various distances from the bushing, as shown, so that each foot may be employed to obtain different predetermined center distances between the drilled holes.

The extremity of the foot carrying the boss 332 is laterally slotted, as at 328a in Figs. 17 and 18, to pass chips cut by the bit. The resulting forward bifurcation 328b is preferably formed with an indicating pointer 328c, positioned on the center line B—B through the axes of the boss 332 and the bore or bores 336. With the collet engaged in a pilot hole in the work, and the pointer 328c overlying a line drawn on the work through the center of the desired drill hole, drilling of the hole in the proper position is facilitated.

The modified spacer foot of Fig. 19 provides for progressive adjustment of the spacing between the drill bushing and bearing post receiving bore, and comprises a member 340 which is of a two-piece, extensible construction. One of these parts 342 carries the drill bushing 344, while the other part 346 is formed with one or more post receiving bores 348, as in the foot of Fig. 18. Part 342 defines a pair of spaced wings 350, in which are fixed a pair of slide bars 352 and between which is formed a generally semi-circular recess 353, as shown. The other part 346 has bores 354 slideably receiving the slide bars 352 so that said parts 342 and 346 may be extended and retracted to vary the center distances between the post receiving bore or bores 348 and bushing 344. The part 346 may have a generally semi-circular portion 355 slideably receivable in the aforesaid semi-circular recess, as shown, and may carry any suitable locking means, such as illustrated at 356, for securing the parts in adjusted position.

In use, the center distance between the bushing 344 and a selected one of the bores 348 is set at a desired value, as by the use of a suitable measuring instrument, and after locking of the parts, the spacer foot is mounted on the drill tool in the same manner as described with reference to the spacer foot of Fig. 18.

In most drilling operations it will be imperative that the spacer foot be extremely rigid on the bearing post 288 so as to not be capable of even the slightest rocking relative thereto. In such situations the set screw 338 of Fig. 18 may not provide a sufficiently rigid attachment.

Resort may be had, in such a case, to the modified attachment of Figs. 23 and 24 wherein the post receiving bore 358 in the spacer foot may be tapered, as shown, and have loosely received therein a split tapered bushing 360 formed with a cylindrical bore for receiving the bearing post 288 of the drill tool. The bushing 360 may be loosely retained in the bore, as by a pin 362. The taper of the bore 358 and bushing 360 will be a locking angle, the arrangement being such that when the post 288 is inserted in the bushing, and the foot is pressed tightly thereon, as by initial clamping of the tool to a workpiece, the foot will be rigidly locked in place by the bushing. Subsequent removal of the foot may be accomplished by a light blow on the latter.

In some applications the present drill tool may be employed in conjunction with a template, in which case the spacer feet may be formed with a protruding annular shoulder 364, shown in Fig. 22, for insertion into holes in the template, indicated at 365.

As was preliminarily indicated, the present drill tool will operate through a complete drilling cycle, including sequential clamping of the tool of the work, advancing of the tool bit through the work, and retraction of the bit, in response to each actuation of the trigger 224. This automatic sequence of operations is accomplished by a pneumatic control system now to be described.

Operating air under pressure for the drill will be received from a supply through a hose, not shown, which will be connected, in the usual manner, to a nipple 366 threaded in the lower end of a bore 368 opening through the butt end of and extending upwardly into the pistol grip handle 222.

Frictionally retained in an intermediate position in this bore and peripherally sealed to the wall of the latter at spaced points, as by the O-rings shown, is a control valve sleeve 370 which is externally grooved at 372 and 374 between adjacent O-ring seals. This sleeve is ported at 376 and 378 in communication with the grooves 372 and 374, respectively.

A first air passage 380 leads from the bore 368, between nipple 366 and valve sleeve 370, to a bore 382 containing a trigger operated pilot valve assembly 384, to be described. A second air passage 386 leads from the valve sleeve outer groove 374 to the air motor 320. A third passage 388 leads from the valve sleeve inner groove 372, through the end wall of body recess 226 into space 262 at the rear side of piston 236.

Axially movable in the valve sleeve 370 is a control valve body 390 including an upper cylindrical portion 392, an intermediate reduced stem 394, and a lower valve core 396 carrying an O-ring for seating in a valve seat 398 at the lower end of the valve sleeve 370.

Extending upwardly through the valve body 390 from the lower end thereof is an axial passage 400 communicating at its upper end, through a transverse passage, with an external peripheral groove 402 in the cylindrical portion 392 of the valve body. The latter portion is formed with a second peripheral groove 404 communicating through an axial slot 406 to the bore 368 in the handle above the valve sleeve, this space being vented to atmosphere through a port 408 in the handle. A piston 410, having a stem fixed in the upper end of the valve body 390, is movable in the reduced upper end of the handle bore 368, the latter forming a cylinder for said latter piston.

The valve body 390 and piston 410 carried thereby are normally urged to an upper limiting position wherein the seal ring on the valve body valve core 396 seats against valve seat 398 and the piston 410 is adjacent the end of the handle bore, by a coil compression spring 412 between the valve core and nipple 366.

Pilot valve assembly 384 comprises, as shown most clearly in Fig. 25, a sleeve 414 threaded in an enlarged outer portion of the pilot valve bore 382 and sealed at its inner end to the wall of the latter bore by an O-ring 416. An intermediate portion of the sleeve is externally, peripherally grooved to form an annular space 418 between the sleeve and wall of the pilot valve bore. A first passage 420 communicates this space 418 with the handle bore 368 (Fig. 20) above the control valve piston 410. A second passage 422 communicates the space 418 with the annular space 234 (Fig. 20) about the cylinder sleeve 232, the latter space communicating with chamber 260 at the forward side of the feed piston 240 through a port 424 (Fig. 20) in sleeve 232.

Pilot valve assembly 384 further comprises a stem 426 reciprocable in a central bore 428 in pilot valve sleeve 414 and extending beyond the forward end of the latter sleeve for abutment with the trigger 224, as shown. Stem 426 includes a forward portion 430 slideably guided in the valve sleeve bore, an intermediate reduced portion, providing an annular clearance space 432 between the stem and valve sleeve, and an after portion 434, the diameter of which is slightly less than the diameter of the bore in the pilot valve sleeve. Beyond the inner end of the pilot valve sleeve, the stem is grooved for receiving an O-ring 436 which is normally urged into sealing engagement with the end of the sleeve by a spring 438 fitted in an inner reduced end of the pilot valve bore 382, the stem 438 having an annular shoulder against which the spring abuts, as shown. Air from passage 380 entering the end of pilot valve bore 382 is valved off by O-ring 436 against passage through sleeve bore 428 around stem portion 434. Depression of trigger 224 will depress stem 426 to the position of Fig. 25, removing O-ring 436 from its seat and so causing air flow past member 434 into space 432, and thence into passages 420 and 422.

As will be shortly more fully explained, the above described valving, in normal inoperative condition, admits air to the space 262 behind the piston 236 to retain the latter, and parts actuated thereby, in the forward extended position shown in Fig. 20. Depression of trigger 224 causes operation of the valving to first admit air to the space 260 at the forward side of piston 236, and vent space 262, for producing rearward retractile or feeding movement of the piston and parts actuated thereby, and operation of the air motor 320 to drive the drill spindle, and subsequent automatic stopping of the air motor and return of the piston 240 and said parts to their extended position, said retractile feed movement occurring at differential rates. This latter automatic return of the parts to their normal condition and differential feed rate are accomplished by depth control and differential feed mechanism to now be described.

To the end of automatic termination of feed movement and return of the parts to normal extended position, the annular space 234 about the cylinder sleeve 232 communicates with the aforesaid depth control mechanism, generally indicated at 440 in Fig. 26, through a passage 442.

This depth control mechanism is contained in a bore 444 extending axially in and opening through the forward end of the drill body 220. Threaded in the outer end of this bore 444 is a sleeve 446 having a bore 448 opening through the outer end thereof and terminating at its inner end in a centrally bored end wall 450. Slideable in the sleeve bore 448 is a plunger 452 mounting a disk head 454 forwardly of the forward end of the drill body and fixed to a stem 456 which projects slideably through the central bore in and inwardly beyond the sleeve internal wall 450. A coil compression spring 458, between wall 450 and plunger 452, biases the latter forwardly. A vent-port 460 communicates bore 448, behind the plunger, to atmosphere. Forward movement of the plunger is limited by abutment of a snap ring 462 on the stem 456 with a seal ring 464 about the stem and bearing against the rear side of wall 450.

Fixed in the rear or inner end of the sleeve 446 is a second sleeve 466 having an enlarged shoulder 468 which is peripherally sealed, by the O-ring shown, to the wall of bore 444. The reduced portion of the second sleeve 466 defines an annular space 470 with which the aforesaid passage 442, leading from the annular space 234 about the cylinder sleeve 232, communicates. The central bore 472 through the shouldered second sleeve, in turn, communicates with the annular space 470 through radial ports 474.

The inner end of stem 456 is reduced, as shown, for loose receipt in the second sleeve bore 472 and is adapted, upon inward or rearward movement of the plunger 452, against the action of spring 458, to engage a valve plate 476. This valve plate is normally retained in flat sealing contact with a protruding annular lip 478 (Fig. 27) on the inner end of the sleeve 466 about the bore 472 therethrough, by a spring biased plunger 480 slideable in the inner end of bore 444 and formed with a rounded, central projection 482 bearing against the center of the valve plate. A port 484 vents the bore 444 rearwardly of valve plate 476 to atmosphere.

The means for accomplishing the previously mentioned differential feed rate is illustrated in Fig. 28 wherein the numeral 486 indicates a passage leading from the space 284 at the rear side of the damping or feed control piston 270 to a bore 488 extending axially in and opening through the forward end of the drill body 220 so that oil may flow between said space 284 and the bore 488. A cylindrical strainer 490 in bore 488, retained in position by the O-rings shown, overlies the end of passage 486 so that oil flow through the latter passage into or out of the bore 488 is through the strainer.

The forward end of the bore 488 is radially enlarged to form an annular ledge or seat 492 at the juncture of the enlarged and reduced portions of the bore. Threaded in the enlarged forward end of the bore 488 is a sleeve 494 having an intermediate, internal transverse wall 496 which is centrally apertured for slidably receiving a stem 498 carrying an enlarged head 500 at its forward or outer end which projects a distance beyond the forward end of the drill body, as shown. Stem 498 is slideably guided in a bushing 502, fixed in the inner end of sleeve 494, and at its rear end in a bore 504 in the drill body. O-ring seals are placed as shown.

Fixed on the stem 498, as by the snap rings illustrated, is a piston 506, which, as shown in the detail of Fig. 29, has a rear tapered portion 508 and a forward cylindrical portion 510. The diameter of this cylindrical portion 510 is such as to provide a close sliding, substantially fluid-tight fit thereof in the reduced portion of bore 488. A coil compression spring 512 normally biases the stem to its forward limiting position, shown in Fig. 28, wherein an annular clearance exists between the piston 506 and the circular edge of ledge 492. Oil is then permitted to flow from the aforesaid space 284, at the rear side of piston 270, through passage 486, bore 488, past the piston 506, and thence through a passage 514 leading from said bore 488 to the space 282 at the forward side of the damping piston 270. Oil flow may, of course, take place in the reverse direction as well.

When the stem 498 is moved rearwardly against the action of spring 512 to the position of Fig. 29, however, the cylindrical portion 510 of the piston 506 moves into the reduced portion of bore 488 so that oil flow past the piston is precluded, as just described.

Under these conditions oil flow from one side of the piston 506 to the other occurs through a passage 516 communicating bore 488, at the rear side of piston 506, to the inner reduced portion of an axial bore 518 opening through the forward end of the drill body, and a passage 520 communicating bore 488, at the forward side of said piston 506, to an outer enlarged portion of said bore 518.

Threaded in the enlarged outer portion of the latter bore 518 is a needle valve 519 which is adjustable toward and away from the annular ledge 522 at the juncture of the reduced and enlarged portions of the bore 518 to vary the area of the annular flow space between said needle valve and the circular edge of said ledge 522. The needle valve is adapted to be locked in adjusted position by a set screw 524 and is sealed to the wall of bore 518 by the O-ring shown. From the above description it will be apparent that the rate of oil flow past the needle valve may be controlled by axial adjustment thereof, for reasons to be presently seen.

The head 454 on the feed stop mechanism plunger 452 and the head 500 on the differential feed mechanism stem 498 are adapted to be engaged by the spacer foot 327 (or 340) for depressing of the plunger and stem, as will be seen. To this end, the plunger and stem are oriented as shown in Figs. 15, 16 and 17, and each spacer foot is formed with a transverse flange 526 at the end of cylindrical boss 332 thereon, which flange will engage the plunger head and stem head in every angular position of the foot. As will be seen, the differential feed mechanism is actuated prior to the depth control mechanism, and, accordingly, the stem head 500 projects forwardly of the plunger head 454 in the normal position of both, as may be observed in Fig. 17.

The depth control and differential feed mechanisms are actuated by the spacer foot for the reason that substantially no distortion of the foot occurs during drilling operations and hence accurate control of these mechanisms is achieved. If the mechanism were actuated by the feed piston, for example, the slight elongation of the piston rod and other parts due to the axial tensile forces therein during drilling operations would introduce errors into the drill and counter-sink depths.

In some cases it may be desirable to provide for adjustable limiting of the forward extensile movement of the piston 236 and parts actuated thereby. Referring to Fig. 30, this may be accomplished by a headed pin 528 axially slideable in the forward partition wall 254 and having its outer or forward end abutting an adjusting screw 530 threaded in a supporting block 532 fixedly carried at the forward end of the drill body 220. The axial position of pin 528 may be adjusted by threading of the adjusting screw 530 and retained in adjusted position by the set screws shown. The damping piston 270 will abut the rear enlarged head on the pin 528 to limit the feed stroke. The pin is sealed, as shown.

*Operation*

Operation of the present drill tool will be described with reference to Figs. 20 and 21, as well as to the diagrammatic illustrations of the pneumatic system shown in Figs. 31, 32 and 33.

The first step in the use of this tool involves the selection of the proper spacer foot, providing for the desired center distance between holes to be drilled and the mounting of the foot on the tool. The manner of mounting the foot on the drill is believed to have been adequately described so no further discussion thereto is deemed necessary at this point.

With trigger 224 released, the parts of the present tool are positioned as shown in Figs. 20 and 31. In this condition of the valving, control valve body 390 is retained in its upper limiting position by spring 412 wherein the O-ring on valve core 396 sealingly engages its seat 398. Pressure air entering the tool through the nipple 366 may, therefore, flow only through passage 380 to the pilot valve 384, which will be closed at this time, and through passage 400 in the valve body 390, groove 402 therein, port 376, groove 372 in the control valve sleeve 370, and passage 388 to the space 262 at the rear of the feed piston 236. The space 260 at the forward side of the feed piston is vented to atmosphere as hereinafter described. Feed piston 236 accordingly is moved to and retained in its forward position of Fig. 20 carrying with it the piston rod 240, sleeve 246, and spacer foot carried on the forward end of the latter sleeve. Also piston rod 240 and, accordingly, arm 296 carrying the collet actuating stem 294, are retained in their forward limiting positions relative to the sleeve 246 and spacer foot so that collet 292 will be contracted. The air motor 320 is inoperative.

In this extended position of the spacer foot, the leading end of the tool bit, which may be a drill or a drill countersink, is spaced a preset distance behind the plane of the work engaging faces 330 of the spacer foot.

Collet 292 is now engaged in a predrilled hole in the workpiece W and the drill tool is bodily turned until the axis of the tool bit overlies a desired point on the work. Where a series of spaced holes are to be drilled along a line scribed on the work, the spacer foot may have a pointed end, as shown in Fig. 15, to facilitate aligning the axis of the tool bit with said work line.

Trigger 224 is now depressed (Figs. 21 and 32) to unseat the pilot valve O-ring 436 whereupon air is permitted to flow from passage 380, through the restricted annular clearance space between pilot valve stem portion 434 and the bore 428 in the pilot valve sleeve 414, through ports 433 into annular space 418 about the pilot valve sleeve, and thence to passages 420 and 422.

Air flowing through passage 420 enters handle bore 368 above control valve piston 410 to move the latter, and the control valve body 390, downwardly to the position of Fig. 21, against the action of spring 412 to unseat the valve core 396 and register groove 404 in the control valve with ports 376 in the control valve sleeve. Air may thus flow past the valve core 396 through port 378 in the valve sleeve 370, into valve sleeve groove 374, and thence through passage 386 to the air motor 320 to cause rotation of the drill spindle and tool bit. The space 262 at the rear side of the feed piston 236 is now cut off from the supply of pressure air and vented to atmosphere through passage 388, groove 372 and port 376, in the control valve sleeve, groove 404 and slot 406 in the control valve, and vent port 408.

Air flowing from the pilot valve 384 through passage 422 enters the annular space 234 about the cylinder sleeve 232 and thence flows through port 424, in the sleeve, to space 260 in front of the feed piston, and through passage 442 (Fig. 26) to the depth control mechanism 440.

Air is prevented from escaping from the stop mechanism 440 through vent port 484 thereof owing to retention of the valve plate 476 in sealing engagement with the annular lip 478 by the spring biased piston. The area of the bore 472 through the mechanism sleeve 466 is made sufficiently small so that the total force exerted by the air on the plate 476 tending to unseat the same is less than the force exerted by the piston 480 on the plate tending to retain the latter seated.

Air entering space 260 at the front of feed piston 236 moves the latter rearwardly. Because of the sliding friction of sleeve 246 and the movement impeding action, to be further explained, of the piston 270 moving in its cylinder, sleeve 246 and spacer foot 327, mounting the collet 292, will initially remain stationary, the feed piston 236 moving rearwardly, as just mentioned, carrying with it piston rod 240, arm 296, and collet actuating stem 294. Collet 292 is thereby expanded in the predrilled hole in the work to clamp the tool to the work.

After the work has been thus firmly clamped, further relative movement of the sleeve 246 and piston rod 240 is precluded so that piston 236, sleeve 246, piston rod 240, and the spacer foot 327 move rearwardly as a unit relative to the drill body and the tool bit 312 so that the latter penetrates the work which is presently clamped to the spacer foot. As previously mentioned, if the work is a fixed piece, the drill body and tool bit will actually be advanced toward the work, while if the work is a free piece, it will be drawn toward the drill body, held stationary by the operator, and, in effect, over the tool bit with resultant penetration of the latter into the work.

During this rearward retraction of the parts, valve disc 276, on the clamping piston 270, is, as previously described, retained in sealing engagement with the piston 270 so that no oil flow can occur through the ports 274 through that piston. Oil displaced from the space 284 rearwardly of the damping piston flows through passage 486 (Fig. 28) strainer 490, differential feed control bore 488, past tapered piston 506 in that bore, which piston will be retained in its aforesaid forward limiting position shown in Fig. 28 by spring 512, through passage 514, into the space 282 at the front of damping piston 270. The rate of feed of the tool bit through the work during this interval is thus limited by the rate at which oil may be displaced from the space 284 to the space 282. This rate of oil displacement is, in turn, governed by the area of the annular orifice between the tapered portion 508 of the differential feed control piston 506 and the circular edge of ledge 492. This feed rate may be adjusted by threading the feed control sleeve 494 into or out of the bore 488 to vary the area of the annular orifice in the normal position of the piston 506.

Continued rearward movement of the feed piston 236 and spacer foot 327 brings the transverse flange 526 on the foot into engagement with the protruding head 500 on stem 498 carrying the piston 506 to move the stem and piston 506 rearwardly to the position of Fig. 29. The cylindrical portion 510 of the piston 506 is now received in the reduced portion of bore 488 and flow past the piston 506 is thus precluded, as earlier described. Further flow of oil from space 284, displaced by rearward movement of the damping piston 270, therefore, is forced to occur through passages 516 and 520 and past the needle valve 519. The rate of this flow and hence the new or secondary feed rate of the tool may be adjusted by adjustment of the needle valve, as described. The needle valve may, for example, be so adjusted that said secondary feed rate will be somewhat less than the initial feed rate and of the proper value for a counter-sinking operation, for example.

Thus, the tool bit 312 may comprise, as shown, a combined drill and countersink, and the dimension X, Fig. 17, of the spacer foot will be closely held such that the flange 526 of the foot contacts the head 500 of the differential feed control stem at substantially the same time that the countersink portion of the tool bit starts to penetrate the work.

Continued rearward movement of the feed piston 236 and spacer foot 327 at the secondary feed rate brings spacer foot flange 526 into contact with the plunger head 454 of the depth control mechanism 440 (Fig. 26) to depress the plunger. Depression of the plunger 452 moves the plunger stem 456 into contact with the valve plate 476 of the stop mechanism unseating the same (Fig. 27) from the annular lip 478 against the action of the spring biased piston 480.

At the instant of separation of the plate 476 from the lip 478, air is permitted to flow around the plate to act on the piston 480 to depress the same against the action of its biasing spring, and uncover the restricted vent port 484. The strength of the piston biasing spring and area of the piston are made such that the force of the air on the piston, with the air escaping to atmosphere through the vent port, is sufficient to retain the piston 480 depressed and the valve plate unseated. The above action occurs substantially simultaneously with the "cracking" of the valve plate 476 and is made to occur, by proper proportioning and adjustment of the parts, at a precise countersink depth.

Prior to the above operation of the depth control mechanism, the rate of air flow through the aforementioned annular flow space between the pilot valve stem portion 434 and the wall of pilot valve sleeve bore 428 (Fig. 25) is relatively low since it will be governed by the rate of feed piston movement. The pressure drop across this annular flow space is therefore negligible, the parts being so proportioned that the pressure on the down stream side of said space, and therefore the pressure acting on control valve piston 410, is sufficient to retain the latter depressed against the action of spring 412, and the control valve 390 in the position of Fig. 21. After the above-described operation of the depth control mechanism, however, the system is vented to atmosphere through the stop mechanism vent port 484, as just mentioned, and the rate of flow through, and accordingly the pressure drop across said annular flow space in the pilot valve increases substantially. The parts are so proportioned that the resultant decreased pressure acting on the control valve piston 410 is insufficient to retain the latter depressed against the action of the spring 412.

The spring 412 thus returns the control valve 390 to its initial or normal position, shown in Fig. 20, wherein air to the motor 320 is cut off at 398, and pressure air is admitted to the space 262 at the rear side of the piston 236, through control valve passage 400, control valve sleeve port 376 and groove 372 and passage 388. The pressure of the air in space 260, forward of the feed piston 236, is substantially reduced for the reasons just mentioned. Rotation of the tool bit 312 is thereby discontinued and the feed piston, and parts actuated thereby, including the spacer foot 327, are relatively moved to their extended position (Fig. 20) with resultant retraction of the tool bit 312 from the work. During this extensile movement of the parts, the valve disc 276 on the damping piston 270 unseats to permit substantially unrestricted oil flow through the piston ports 274 and relatively rapid forward, or extensile, movement of the parts.

Forward movement of sleeve 246 and spacer foot 327 is terminated by abutment of its after sleeve shoulder 248 with the rear partition wall 252. Forward movement of the piston 236, piston rod 240, arm 296 and collet actuating stem 294 carried by the latter, however, continues for a brief interval, due to the limited relative axial movement permitted between the parts, with resultant forward movement of the stem 294 relative to the collet 292 and contraction of the latter to release the work.

So long as the trigger is retained in its depressed position, the depth control mechanism valve plate 476 remains unseated and the control valve 390 remains in the position of Fig. 20. Upon release of the trigger, however, air to the depth control mechanism is cut off by return of the pilot valve stem 426 to its normal position (Fig. 20) by spring 438, and the valve plate 476 is reseated by the piston 480 of the depth control mechanism to condition the tool for repetition of the above cycle of operation.

From the foregoing, it will be apparent that by selection of a spacer foot having the proper spacing between the axes of the bearing post receiving bore 336 and drill bushing 334, accurately spaced holes of any desired center distance may be drilled with a minimum of manual manipulation and time consumption.

There have been disclosed in the foregoing several illustrative embodiments of the invention which are fully capable of attaining the objects and advantages preliminarily set forth. While certain physical embodiments of the invention have been described and illustrated, they are intended to be illustrative, rather than limiting, in nature, it being apparent that numerous modifications in design and arrangement of parts are possible within the scope of the following claims.

I claim:

1. A machine tool comprising: a body, a motor supported thereby, a spindle driven by said motor journalled in said body, a tool bit on said spindle forwardly of said body, a work engaging foot positioned forwardly of said body having a work engaging face, a carriage means for said foot on and extending forwardly from said body and reciprocable relative to said body in a direction parallel to said spindle to move said foot between an advanced position wherein its work engaging face is forward of said tool bit, and a retracted position in which said tool bit projects forwardly of said work engaging face of said foot, a work securing means for holding a workpiece against said face of said foot, a carriage means for said work securing means extending from said body and reciprocable relative to said body and to said foot carriage means to move said work securing means between an advanced position forwardly of said work engaging face of said foot when said foot is in said advanced position, and a retracted position inward of the advanced position of said engaging face of said foot, a cylinder in said body parallel to said spindle, said carriage means for said work securing means comprising a shaft concentrically disposed within said cylinder and a piston on said shaft slideably fitted in said cylinder, said foot carriage means comprising a sleeve slideably fitted on said shaft, means for initially positioning said sleeve and shaft with said foot and work securing means in said advanced positions, and means for delivering air under pressure within said cylinder forwardly of said piston to move said piston and said shaft inward into said body from said advanced position to a retracted position in which said work securing means has first clamped the work against said foot and then retracted the work and foot to a position relative to said body in which the tool bit has fully penetrated the work.

2. The subject matter of claim 1, including means for delivering air under pressure within said cylinder to the rear of said piston to extend said shaft and work securing means to said advanced position, and interengaging abutments on said shaft and sleeve by which said sleeve and work foot are extended to advanced position by such extension of said shaft and work securing means.

3. The subject matter of claim 1, including means for delivering air under pressure within said cylinder to the rear of said piston to extend said shaft and work securing means and said sleeve and work foot to said advanced positions.

4. The subject matter of claim 3, including a pneumatic control system comprising a manual trigger, a first air passage for exhausting air under pressure from said cylinder in back of said piston to atmosphere, an air chamber adapted for connection with a source of pressure air, a second air passage leading from said chamber and adapted to deliver air under pressure to said cylinder in back of said piston, a third air passage leading from said chamber and adapted to deliver air under pressure to said cylinder in front of said piston, a shuttle valve having two valve elements thereon, two seats for said shuttle valve alternately closed by said valve elements in alternate positions of said shuttle valve, one of said seats controlling said first air passage, the other of said seats controlling said second air passage, spring means normally urging said shuttle valve to seat on said one valve seat, whereby to block said first passage and open said second passage, said shuttle being trigger controlled to move to its alternate position against said spring to open said first passage and close said second passage upon initial depression of said trigger, whereby air is exhausted from the cylinder from in back of the piston, and air feed to the cylinder in back of the piston is interrupted, a valve and valve seat controlling said third passage, and a spring normally holding said valve in closed position, said last-mentioned valve being movable against said last-mentioned spring by further depression of said trigger to open said third passage and thereby feed air to said cylinder in front of said piston.

5. The subject matter of claim 3, including a pneumatic control system comprising a manual trigger, a first air passage for exhausting air under pressure from said cylinder in back of said piston to atmosphere, an air chamber adapted to connection with a source of pressure air, a second air passage leading from said chamber and adapted to deliver air under pressure to said cylinder in back of said piston, a third air passage leading from said chamber and adapted to deliver air under pressure to said cylinder in front of said piston, a shuttle valve having two valve elements thereon, two seats for said valve alternately closed by said valve elements in alternate positions of said shuttle valve, one of said seats controlling said first air passage, the other of said seats controlling said second air passage, spring means normally urging said shuttle valve to seat on said one valve seat, whereby to block said first passage and open said second passage, said shuttle being trigger controlled to move to its alternate position against said spring to open said first passage and close said second passage upon initial depression of said trigger, whereby air is exhausted from the cylinder from in back of the piston, an air feed to the cylinder in back of the system is interrupted, a shiftable member carrying said other valve seat for said shuttle valve, a valve on said shiftable member and a valve seat therefor controlling said third air passage, and a spring normally holding said shiftable member in a normal position thereof with the valve thereon seated on its said seat, said shiftable member being movable by said shuttle valve by further depression of said trigger to open said third passage and thereby feed air to said cylinder in front of said piston.

6. The subject matter of claim 4, in which said motor is an air motor, and in which said third air passage also delivers air to said air motor, whereby depression of said trigger first exhausts air from the space in said cylinder in back of said piston and also cuts off further air delivery to said space, and then feeds air to the space in said cylinder in front of said piston and also feeds air to said air motor.

7. A machine tool comprising: a body, a motor supported thereby, a spindle driven by said motor journalled in said body, a tool bit on said spindle forwardly of said body, a foot positioned forwardly of said body having a forward engaging face at right angles to said spindle, a carriage means for said foot on and extending forwardly from said body and reciprocable relative to said body in a direction parallel to said spindle to move said foot between advanced and retracted positions, in which said face of said foot is respectively forward and rearward of the extremity of said bit, a securing means movable relative to said body and to said foot in a direction parallel to said spindle and adapted to hold a member fast against said engaging face of said foot, a carriage means for said securing means on and extending forwardly from said body and reciprocable relative to said body and to said foot carriage means, a cylinder in said body parallel to said spindle, said carriage means for said securing means comprising a shaft concentrically disposed within said cylinder and a piston on said shaft working in said cylinder, and means for extending and retracting said carriage means for said foot and securing means relative to said body comprising a first passage means in said body extending between the rear end of said cylinder and a pressure fluid inlet on said body, a second passage means in said body for exhausting fluid from the rear end of said cylinder to atmosphere, pressure fluid operated control valve means biased to an initial position wherein it opens said first passage means to cause flow of pressure fluid to the rear end of said cylinder, and closes said second passage means, and movable by pressure fluid admitted thereto to a second position closing said first passage means and opening said second passage means, a third passage means in said body for conveying pressure fluid from said inlet to said control valve for operating the same and to said cylinder forwardly of said piston, and a manual valve controlling said third passage means operable to admit pressure fluid to said cylinder forwardly of said piston to retract said piston in said cylinder, and simultaneously to admit pressure fluid to said control valve to move the same from its said initial position to its said second position whereby to admit pressure fluid to the forward end of said cylinder and to exhaust fluid from the rearward end of said cylinder to atmosphere.

8. A machine tool, comprising: a body, a spindle mounted on and extending forwardly of said body and including a tool bit at its forward end, a pilot element forwardly of the body, a first carriage means mounting said pilot element on the body for movement parallel to said spindle, a foot forwardly of the body having a forward engaging face normal to the axis of said spindle, a second carriage means mounting said foot on the body for movement parallel to said spindle, a cylinder in said body parallel to said spindle, said carriage means for said pilot element including a piston in said cylinder and a shaft mounting said piston and extending forwardly from said body, said carriage means for said foot comprising a member reciprocable in said body on an axis parallel to said spindle and extensible from said body with said pilot element carriage means, a first passage means in said body between the rear end of said cylinder and a pressure fluid inlet on said body, a second passage means in said body for exhausting fluid from the rear end of said cylinder to atmosphere, a pressure fluid operated control valve means biased to and occupying an initial position when pressure fluid acting thereon is below a given value, wherein it opens said first passage means to cause flow of pressure fluid to said rear end of said cylinder to advance said piston, and closes said second passage means, and movable against said bias, when said pressure fluid acting thereon attains said given value, to a second position closing said first passage means and opening said second passage means, a third passage means extending from said inlet to said control valve for conveying pressure fluid thereto for moving the same to said second position and to the cylinder forwardly of the cylinder, a fourth passage means extending from the forward end of the cylinder to atmosphere, a manually operable valve device in said third passage means biased to a normal closed position cutting off the flow of pressure fluid to said control valve and to said forward end of the cylinder, said valve device being operable to pass pressure fluid to said control valve and to said forward end of said cylinder to retract said piston, said control valve being thereby moved to its said second position to cut off flow of pressure fluid to the rear end of the cylinder and to exhaust fluid therein to atmosphere, a control mechanism on said body including a member engageable and operable by said foot during retraction thereof, said mechanism including normally closed valve means in said fourth passage means, said latter valve means being opened by actuation of said mechanism by said foot, and said manually operable valve device including throttling means for dropping the pressure of fluid flowing to the control valve and cylinder forwardly of the piston below said given valve in response to the increased rate of fluid flow through said valve device when said valve means in said fourth passage means is opened to effect return of said control valve to said first position and return of the carriage means to extended position.

9. The subject matter of claim 8 wherein said valve means in said fourth passage means comprises a restricted passage therein and a valve seat at the downstream end thereof, a valve element at the downstream side of and adapted to seat on said valve seat to seal said passage, a spring biased piston downstream of the valve element retaining the latter on said seat against the pressure of fluid in said restricted passage, there being a vent to atmosphere between said piston and valve element, and the force of the piston on the valve element tending to retain the latter seated being greater than the force of the fluid in said passage tending to unseat the valve element, said control mechanism including means movable into engagement with the valve element upon said actuation of the mechanism by said foot to unseat the element and depress said piston, pressure fluid flowing past the unseated valve element to atmosphere through said vent and acting on said piston, and the area of the piston being such that the pressure of the fluid acting thereon will retain said piston depressed and said valve element unseated until said manual valve device is released.

10. In a power tool of the character described, a body including a cylinder, carriage means including a piston movable in the cylinder, first passage means extending between a pressure fluid inlet on said body and the cylinder at the rearward side of said piston, second passage means extending between said cylinder at said rearward side of the piston and atmosphere, a pressure fluid operated valve member in said passage means biased to take a first position when the pressure thereon is less than a given value and moved to a second position when said pressure exceeds said value, said valve member blocking said second passage means and said first passage means being open in said first position of the member, and said member blocking said first passage means and said second passage means being open in said second position of the member, third passage means communicating said inlet to said valve member for conveying pressure fluid to the latter for operating the same and to said cylinder forwardly of the piston, normally closed manual valve means in said third passage means adapted to be opened to simultaneously admit pressure fluid to said valve to move the latter to said second position and to the cylinder forwardly of the piston, fourth passage means between the cylinder forwardly of the piston and atmosphere, normally closed valve mechanism in said fourth passage means, and cooperating means on the carriage means and mechanism for opening the latter upon predetermined movement of the carriage means, said manual valve means including throtting means for dropping the pressure of fluid flowing to the cylinder forwardly of the piston and to said member below said given value in response to the increased rate of flow through said manual valve means when said mechanism is opened to cause return of said member to its first position and reversed movement of the carriage means.

11. In a machine tool of the character described, the combination of: a body, a rotatable tool spindle supported against axial travel on said body and extending forwardly therefrom, a pilot element positioned forwardly of said body engageable in a preformed pilot hole in a workpiece or the like by axial movement thereof parallel to said spindle axis, and supporting means for said pilot element carried by said body forwardly thereof and arranged for swinging adjustment movement about an axis parallel to and laterally offset from the axis of said spindle, said supporting means supporting and guiding said pilot element for said axial movement thereof along an adjusted axis parallel to and laterally offset an adjusted distance from the spindle axis and laterally offset also from the swinging adjustment axis of said supporting means, whereby the perpendicular spacing distance between said spindle axis and said pilot axis is variable by said swinging adjustment movement of said supporting means.

12. The subject matter of claim 11, including power means on said body for axially extending and retracting said pilot element relative to said body.

13. The subject matter of claim 11, including power means on said body for extending and retracting said supporting means relative to said body along a direction line parallel to said spindle.

14. The subject matter of claim 11, wherein said tool spindle mounts at its forward end a tool bit having a cylindrical portion, and including spacer means mounted on said supporting means and extending between said supporting means and said bit, said spacer means having a bore whose axis is spaced from the pilot element axis by a distance equal to the adjusted spacing distance between the spindle axis and pilot axis, said bore slideably and rotatably receiving said cylindrical portion of siad tool bit.

15. The subject matter of claim 14, including also power means on said body for moving said supporting means relatively to said body along a direction line parallel to said spindle.

16. A machine tool comprising: a body, a rotatable spindle supported against axial travel on and extending forwardly of said body, said spindle including a forward axially extending tool bit, a pilot element paralleling said spindle and disposed forwardly of said body for engaging in a preformed hole in a workpiece or the like, adjustable support means supporting said pilot element on said body for lateral adjustment relative to said tool bit to vary the perpendicular spacing between said tool bit and pilot element, said support means being supported on said body for relative extension and retraction parallel to said spindle, spacer means extending between said pilot element and tool bit for maintaining a fixed spacing therebetween, said spacer means including a forward work engaging surface and bearing means immediately behind said surface slideably receiving said tool bit, and means securing said spacer means to said support means.

17. A machine tool comprising: a body, a spindle supported on and extending forwardly of said body, said spindle including a forward axially extending tool bit, a pilot element substantially paralleling said spindle and disposed forwardly of said body for engaging in a preformed hole in a workpiece or the like, adjustable support means supporting said pilot element on said body for lateral adjustment relative to said tool bit to vary the perpendicular spacing between said tool bit and pilot element, said support means being supported on said body for relative axial extension and retraction parallel to said spindle, and a spacer member including a forward work engaging surface, said spacer member having a parallel bore and sleeve bearing extending transversely of and opening through said surface, said member being removably fitted onto said supporting means over said pilot element and tool bit with said pilot element extending through said bore and said tool bit extending slideably through said bearing.

18. The subject matter of claim 17 wherein said spacer member comprises a pair of telescopic sections, said bore being formed in one of said sections and said sleeve bearing being carried on the other section whereby the spacing between said bore and bearing may be varied by telescopic adjustment of said sections, and means for releasably securing said sections together.

19. A machine tool comprising: a body, a rotatable spindle supported against axial travel on and extending forwardly of said body, said spindle including a forward axially extending tool bit, forwardly extending pilot means supported on said body, said means including a post mounted in said body parallel to said spindle for rotation and for axial travel relative to said body, said post extending forwardly from said body, an arm on the forward end of said post, a pilot element paralleling said tool bit supported on the free end of said arm for engaging in a preformed hole in a workpiece or the like, rotation of said post in said body swinging said arm for laterally adjusting said pilot element relative to said tool bit to vary the perpendicular spacing therebetween, a spacer member extending between said pilot element and tool bit for maintaining a fixed preselected spacing therebetween, said spacer member including a forward work engaging surface in a plane transverse of said spindle and post, and bearing means directly behind said surface slideably receiving said tool bit.

20. A portable power tool, comprising: a portable tool body to be held in the hand, a rotatable spindle supported against axial travel on and extending forwardly of said body, said spindle including a forward axially extending tool bit, an expansive collet sleeve substantially paralleling said spindle disposed forwardly of said body for engaging in a preformed hole in a workpiece or the like, carriage means supporting said collet sleeve on said body for axial extension and retraction and for lateral adjustment to vary the spacing between the sleeve and tool bit, spacer means fixed to a forward portion of said carriage means and extending between said collet sleeve and tool bit for maintaining a preselected fixed spacing therebetween, said spacer means including a forward work engaging surface and bearing means directly behind said surface and slideably receiving said tool bit, means on said carriage means for expanding said collet sleeve, and power means in said body for extending and retracting said carriage means and operating said collet expanding means.

21. The subject matter of claim 20, wherein said carriage means is mounted in said body for rotational adjustment about an axis parallel to said spindle and laterally offset from the axis of said collet sleeve.

22. In a power drill, the combination of: a body, a motor supported thereby, a spindle driven by said motor and journalled in said body, a tool bit on the end of said spindle projecting forwardly from said body, a work foot positioned forwardly of said body having a forward work engaging face transverse of said spindle, a carriage for said foot extending from said body and reciprocable on said body to move said foot between an advanced position wherein its said face is forward of the forward end of said bit, and a retracted position in which said bit projects forwardly of said face, a work securing and pilot means comprising a reciprocable draw bar disposed parallel to said spindle and extending through a bore in said foot to an advanced position forwardly of said foot, said draw bar having an enlarged pilot head on its forward extremity dimensioned to pass with close tolerance through a pilot hole in a workpiece or the like, a rearwardly tapering cam element on said draw bar immediately in back of said pilot head, a collet comprising a sleeve surrounding and longitudinally movable on said draw bar and longitudinally slideable in said bore in said foot to project at least partially forwardly of said face on said foot, said collet formed with a plurality of forwardly extending normally contracted spring fingers lying normally, in an advanced position thereof, adjacent said draw bar at the base of said tapering cam element when said draw bar is also in advanced position, and being expansible by said tapered cam element upon withdrawal of said draw bar relative to said collet, outwardly extending lugs on the forward end portions of said collet fingers, the outside dimension of the collet between diametrically opposite lugs being sufficiently small for penetration of said pilot hole when said fingers are contracted, but too great for passage through said pilot hole when said fingers are expanded, a stop on said foot and an opposed shoulder on said collet limiting outward extension of said collet beyond said foot to said advanced position, a spring surrounding said draw bar in back of said collet for urging said collet to extend in a forward direction from said bore in said foot to said advanced position, said spring being adapted to hold said collet in said advanced position during withdrawal of said draw bar and expansion of said collet fingers until said pilot head engages the collet fingers, a carriage for said draw bar extending from said body and reciprocable on said body to move said draw bar between said advanced position with said pilot head spaced forwardly from said engaging face of said foot when said foot is in said advanced position, and a retracted position, means for moving said draw bar carriage to position said foot and draw bar in said advanced positions, and means for thereafter retracting the carriage for said draw bar, whereby said draw bar moves relatively to said collet and said cam element thereon expands said collet fingers, said spring holding said collet in the advance position thereof until the forward ends of the expanded collet fingers are engaged by the collet head, and said draw bar then moves said collet rearwardly until said collet lugs engage the workpiece around said pilot hole, and whereby said foot and carriage therefor thereafter retract as a unit with said draw bar to draw the workpiece against the bit.

23. The subject matter of claim 22, wherein there are a pair of the drill spindles positioned parallel to one another, and the draw bar is spaced midway between and parallel to the axes of said drill spindles.

24. The subject matter of claim 22, including also a fixed pilot pin mounted on said work head parallel to said spindle and draw bar and spaced beyond said draw bar from the axis of said spindle, with equal spacing distances between the draw bar axis and spindle axis and the draw bar axis and fixed pilot pin axis.

25. In a power drill, the combination of: a body, a motor supported thereby, a spindle driven by said motor and journalled in said body, a tool bit on the end of said spindle projecting forwardly from said body, a work foot positioned forwardly of said body having a forward work engaging face transverse of said spindle, a carriage for said foot extending from said body and reciprocable on said body to move said foot between an advanced position wherein its said face is forward of the forward end of said bit, and a retracted position in which said bit projects forwardly of said face, a work securing and pilot means comprising a reciprocable draw bar extending through a bore in said foot to an advanced position with its forward extremity spaced forwardly from said foot, said draw bar having an enlarged pilot head on its forward extremity dimensioned to pass through a pilot hole in a workpiece or the like, a rearwardly convergent cam element on said draw bar rearward of said head, a collet comprising a sleeve surrounding and longitudinally movable on said draw bar and longitudinally slideable in said bore in said foot, said collet comprising a plurality of forwardly extending normally contracted spring fingers projecting at least partially forwardly of said engaging face of said foot and adapted to enter said pilot hole in said workpiece, said fingers lying adjacent the base of said convergent cam element on said draw bar when said draw bar is in its said advanced position, and being expansible by said convergent cam element upon withdrawal of said draw bar relative to said collet, a spring opposing retraction of said collet in said bore during expansion thereof by said draw bar, a carriage for said draw bar extending from said body and reciprocable on said body to move said draw bar between said advanced position and a retracted position, means for moving said draw bar carriage to position said foot and draw bar in advanced positions, and means for thereafter retracting the carriage for said draw bar, whereby said draw bar first moves relatively to said collet and said cam expands said collet fingers to grip said workpiece and secure it against separation from said foot, and whereby said foot and foot carriage are thereafter retracted toward said body as a unit with said draw bar and draw bar carriage.

26. In a device of the character described, the combination of: a foot having an engaging face engageable with a part to which the device is to be secured and having a bore therethrough at right angles to said face, a collet sleeve longitudinally movable in said bore and having a forward portion projecting beyond said engaging face of said foot, the forward portion of said collet sleeve being formed with a plurality of normally contracted, radially expansive spring fingers, an abutment limiting longitudinal movement of said collet sleeve in said bore in the forward direction to a predetermined advance limiting position, a draw bar extending through and forwardly of said collet sleeve and having on its forward end an enlarged portion, said draw bar having behind said portion a rearwardly convergent cam which is engageable with said normally contracted spring fingers and adapted to radially expand the same upon retraction of said draw bar relative to said collet sleeve, and spring means for yieldingly urging said collet sleeve into engagement with said abutment, said spring means being adapted to support said collet sleeve against longitudinal movement in said bore while said draw bar is moving to expand the collet fingers, and said collet sleeve being shaped and dimensioned for limited longitudinal retraction within said bore in said foot from said advance position with said collet fingers in radially expanded position.

27. The subject matter of claim 26, wherein the extremities of said collet fingers are formed with outwardly turned clamping toes.

28. In a machine tool of the class described, a body, a carriage movable axially of the body, a piston on said carriage, a cylinder in said body in which said piston is movable, passage means communicating the cylinder spaces at opposite sides of said piston, liquid filling said cylinder and passage means, said passage means including a pair of passages arranged in parallel through which liquid displaced from one side of the piston by movement of the latter may flow to the other side of the piston, means restricting one of said passages, normally open valve means in the other passage, and cooperating means on said carriage means and valve means for closing the latter upon predetermined movement of the carriage means.

29. A machine tool comprising: a body, a spindle journalled in but supported against axial movement in said body and projecting forwardly from said body, a tool bit on the forward extremity of said spindle comprising a drill and a countersink, a work engaging foot positioned forwardly of said body, carriage means mounting said foot on said body for movement parallel to said spindle, controllable power means on said body for moving said carriage in reverse directions, and control means including a device on the body engaged by a member moving with said foot and carriage at a preselected position in the retraction of said foot and carriage toward said body for reducing the speed at which said carriage is advanced by said power means.

30. The subject matter of claim 29 wherein said control means comprises a piston fixed to said carriage means, a cylinder in said body in which said piston moves, passage means communicating the cylinder spaces at opposite sides of said piston, liquid filling said cylinder and passage means, said passage means including a pair of passages arranged in parallel through which liquid may flow from one side of the piston to the other, flow restricting means in one of said passages, and said mechanism including normally open valve means in the other passage which valve means are closed upon said actuation of the mechanism to prevent flow through said other passage whereby flow of said liquid will be forced to occur through said one restricted passage.

31. In a power drill, the combination of: a body, a drill spindle rotatable in said drill body, and means for axially positioning said spindle comprising an externally threaded adjustment sleeve axially fixed to said shaft but permitting said shaft to rotate freely, said sleeve being screw-threaded into a threaded bore in said body, a stem secured to said sleeve, a member of non-circular outline on said stem, a tube having an opening of corresponding outline slideably fitted on said non-circular member, a serrated end portion on said tube, said body having a correspondingly serrated socket in which said serrated end portion is receivable, and spring means yieldingly urging said serrated end portion of said tube into engagement with said socket, said tube being movable axially against said spring to disengage said serrated portion with said socket to permit rotation of said tube.

32. In a power drill, the combination of: a body, a motor supported thereby, a spindle driven by said motor and journalled in said body, a tool bit on the end of said spindle projecting forwardly from said body, a foot positioned forwardly of said body having a forward engaging face transverse of said spindle, a carriage for said foot extending from said body and reciprocable on said body to move said foot between an advanced position wherein its said face is forward of the forward end of said bit, and a retracted position in which said bit projects forwardly of said face, a securing means comprising a reciprocable draw bar extending through an opening in said foot to an advanced position with its forward extremity spaced forwardly from said foot, the forward extremity of said draw bar being dimensioned to pass through a pilot hole in a part positioned adjacent said engaging face of said foot, a rearwardly convergent cam element on said draw bar, a collet surrounding and longitudinally movable on said draw bar through said opening in said foot, said collet including a plurality of forwardly extending normally contracted spring-gripping fingers projecting at least partially forwardly of said engaging face of said foot and adapted to enter said pilot hole, said fingers lying contracted adjacent the base of said convergent cam element on said draw bar when said draw bar is in its said advanced position, and being expansible by said covergent cam element upon withdrawal of said draw bar relative to said collet, a spring opposing retraction of said collet relative to said foot during expansion thereof by said draw bar, a carriage for said draw bar extending from said body and reciprocable on said body to move said draw bar between said advanced position and a retracted position, means for moving said draw bar carriage to position said foot and draw bar in advanced positions, and means for thereafter retracting the carriage for said draw bar, whereby said draw bar first moves relatively to said collet and said cam expands said collet fingers to grip said part and secure it against separation from said foot, and whereby said foot and foot carriage are thereafter retracted toward said body as a unit with said draw bar and draw bar carriage.

33. A spacer foot for a power drill of the character described, comprising: a spacer bar having a forward face presentable toward a workpiece or the like, a cylindrically bored bearing member for a tool bit projecting rearwardly from a rearward side of said bar adjacent one end of said bar, said end of said bar having a bore therethrough in axial alignment with said bearing member, means at said end of said bar formed around said bore with a face engageable with said workpiece, means forming an engaging face at the forward side of the opposite end of said bar, the intermediate portion of said bar, between said faces, being formed with an aperture for receiving a collet-mounting barrel, and means on said bar for securing said bar against movement axially of said barrel.

34. The subject matter of claim 33, including a pointer on said first-mentioned end of said bar in alignment with a center line through the axis of said bearing and the center of said aperture collet barrel receiving aperture.

35. The subject matter of claim 33, wherein said first-mentioned end of said bar is formed with a lateral slot intersecting said bore in said end of said bar for discharging chips cut by said tool bit.

36. The subject matter of claim 33, wherein said bar is formed on its first-mentioned end, around said bore therein, with a projecting annular shoulder.

37. The subject matter of claim 33, including means on the rearward end of said bearing engageable with control means on said power drill.

38. A machine tool comprising: a body, a spindle journalled in but supported against axial movement in said body and projecting forwardly from said body, a drill bit on the forward end of said spindle, a work engaging foot positioned forwardly of said body, carriage means mounting said foot on said body for movement parallel to said spindle, controllable power means on said body for moving said carriage in reverse directions, and depth control means including a device on said body engaged by a member moving with said foot at a preselected position in the relative retraction of said foot and carriage toward said body for terminating said retraction.

39. In a power drill of the class described, a body, a spindle journalled in said body but supported against axial movement relative thereto, a drill bit on the forward end of said body, a work engaging foot positioned said foot mounting means including a cylinder in said body for travel parallel to said spindle, feed means for said foot mounting means including a cylinder in said body parallel to said spindle and piston means therein, pneumatic means for feeding pressure air to said cylinder to move said piston means therein in a direction to relatively retract said work foot relatively to said body, and air control means on said body actuated by said work foot at a preselected position in the retraction thereof for interrupting said feeding of pressure air to said cylinder whereby to terminate said retraction.

40. The subject matter of claim 39, wherein said air control means includes an actuating plunger engaged and depressed by said work foot.

References Cited in the file of this patent

UNITED STATES PATENTS

| | | |
|---|---|---|
| 2,365,787 | Wallace | Dec. 26, 1944 |
| 2,570,618 | Werner | Oct. 9, 1951 |
| 2,612,793 | Timpner | Oct. 7, 1952 |

FOREIGN PATENTS

| | | |
|---|---|---|
| 2,499 | Great Britain | May 26, 1882 |
| 502,374 | Great Britain | Mar. 16, 1939 |